United States Patent
Lee et al.

(10) Patent No.: US 12,317,229 B2
(45) Date of Patent: May 27, 2025

(54) METHOD AND DEVICE FOR TRIGGERING MEASUREMENT/REPORT OF APERIODIC SIDELINK CHANNEL STATE INFORMATION ON BASIS OF RETRANSMISSION RESULT IN WIRELESS COMMUNICATION SYSTEM

(71) Applicant: LG ELECTRONICS INC., Seoul (KR)

(72) Inventors: Jongyoul Lee, Seoul (KR); Hanbyul Seo, Seoul (KR); Giwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 618 days.

(21) Appl. No.: 17/440,925

(22) PCT Filed: Mar. 19, 2020

(86) PCT No.: PCT/KR2020/003804
§ 371 (c)(1),
(2) Date: Sep. 20, 2021

(87) PCT Pub. No.: WO2020/190065
PCT Pub. Date: Sep. 24, 2020

(65) Prior Publication Data
US 2022/0167312 A1    May 26, 2022

(30) Foreign Application Priority Data
Mar. 21, 2019    (KR) .................. 10-2019-0032307

(51) Int. Cl.
*H04W 72/02*    (2009.01)
*H04L 1/1812*    (2023.01)
(Continued)

(52) U.S. Cl.
CPC .......... *H04W 72/02* (2013.01); *H04L 1/1812* (2013.01); *H04L 5/0051* (2013.01); *H04L 5/0053* (2013.01); *H04W 72/542* (2023.01)

(58) Field of Classification Search
CPC ..... H04W 48/08; H04W 48/04; H04W 24/02; H04W 72/082; H04B 7/18513; H04B 7/18526; H04L 5/0023
See application file for complete search history.

(56) References Cited

U.S. PATENT DOCUMENTS

2018/0206176 A1    7/2018  Panteleev et al.
2021/0058219 A1*   2/2021  Kimura .................... H04L 5/14
(Continued)

OTHER PUBLICATIONS

Huawei et al., Sidelink CSI, R1-1903070, 3GPP TSG RAN WG1 Meeting #96, Feb. 15, 2019, see sections 2-3, and figure 1.
(Continued)

*Primary Examiner* — Iqbal Zaidi
(74) *Attorney, Agent, or Firm* — BRYAN CAVE LEIGHTON PAISNER LLP

(57) ABSTRACT

Proposed is a method for operating a first device in a wireless communication system. The method may comprise: a step for requesting a report of a channel state, on the basis of information related to a sidelink resource and HARQ information; a step for transmitting an RS related to the measurement of the channel state to a second device; a step for receiving a measurement result related to the channel state from the second device; and a step for reporting the measurement result to a base station.

15 Claims, 30 Drawing Sheets

(51) Int. Cl.
  *H04L 5/00*        (2006.01)
  *H04W 72/542*      (2023.01)

(56) References Cited

U.S. PATENT DOCUMENTS

2021/0385842 A1* 12/2021 Zhao .................... H04L 5/0091
2022/0191962 A1*  6/2022 Di Girolamo ........ H04L 5/0053
2022/0286255 A1*  9/2022 Guo ...................... H04L 5/006

OTHER PUBLICATIONS

Samsung, Consideration on Sidelink CSI, R1-1902279, 3GPP TSG RAN WG1 #96, Feb. 15, 2019, see sections 2-3, 6.
CATT, Discussion on physical layer procedures in NR V2X, R1-1901993, 3GPP TSG RAN WG1, Meeting #96, Feb. 16, 2019, see sections 3-4.
Convida Wireless, Discussion on Sidelink Procedures, R1-1903153, 3GPP TSG RAN WG1 Meeting #96, Feb. 16, 2019, See section 2.

* cited by examiner (a)

(b)

(a)

(b)

METHOD AND DEVICE FOR TRIGGERING MEASUREMENT/REPORT OF APERIODIC SIDELINK CHANNEL STATE INFORMATION ON BASIS OF RETRANSMISSION RESULT IN WIRELESS COMMUNICATION SYSTEM

This application is the National Stage filing under 35 U.S.C. 371 of International Application No. PCT/KR2020/003804 filed on Mar. 19, 2020, which claims priority to Korean Patent Application No. 10-2019-0032307 filed on Mar. 21, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating the first device 100 in a wireless communication system is proposed. The method may comprise transmitting information requesting a channel state report to a second apparatus, based on information related to a sidelink resource and HARQ information; transmitting a reference signal (RS) related to the channel state measurement to the second apparatus; receiving a measurement result related to the channel state from the second apparatus; and reporting the measurement result to a base station.

EFFECTS OF THE DISCLOSURE

The user equipment (UE) may efficiently perform SL communication.

DESCRIPTION OF EXEMPLARY EMBODIMENTS

Figure 1:
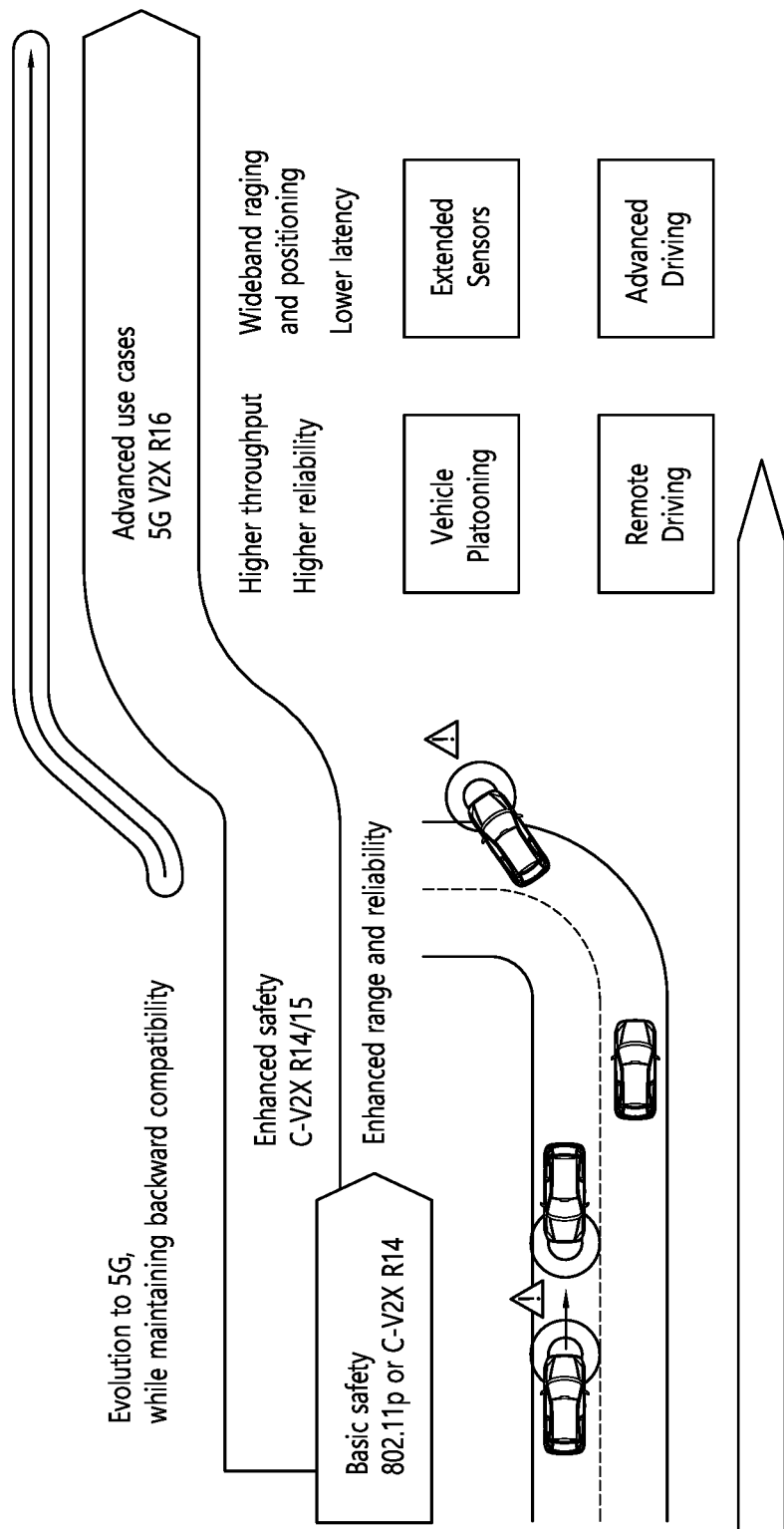
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
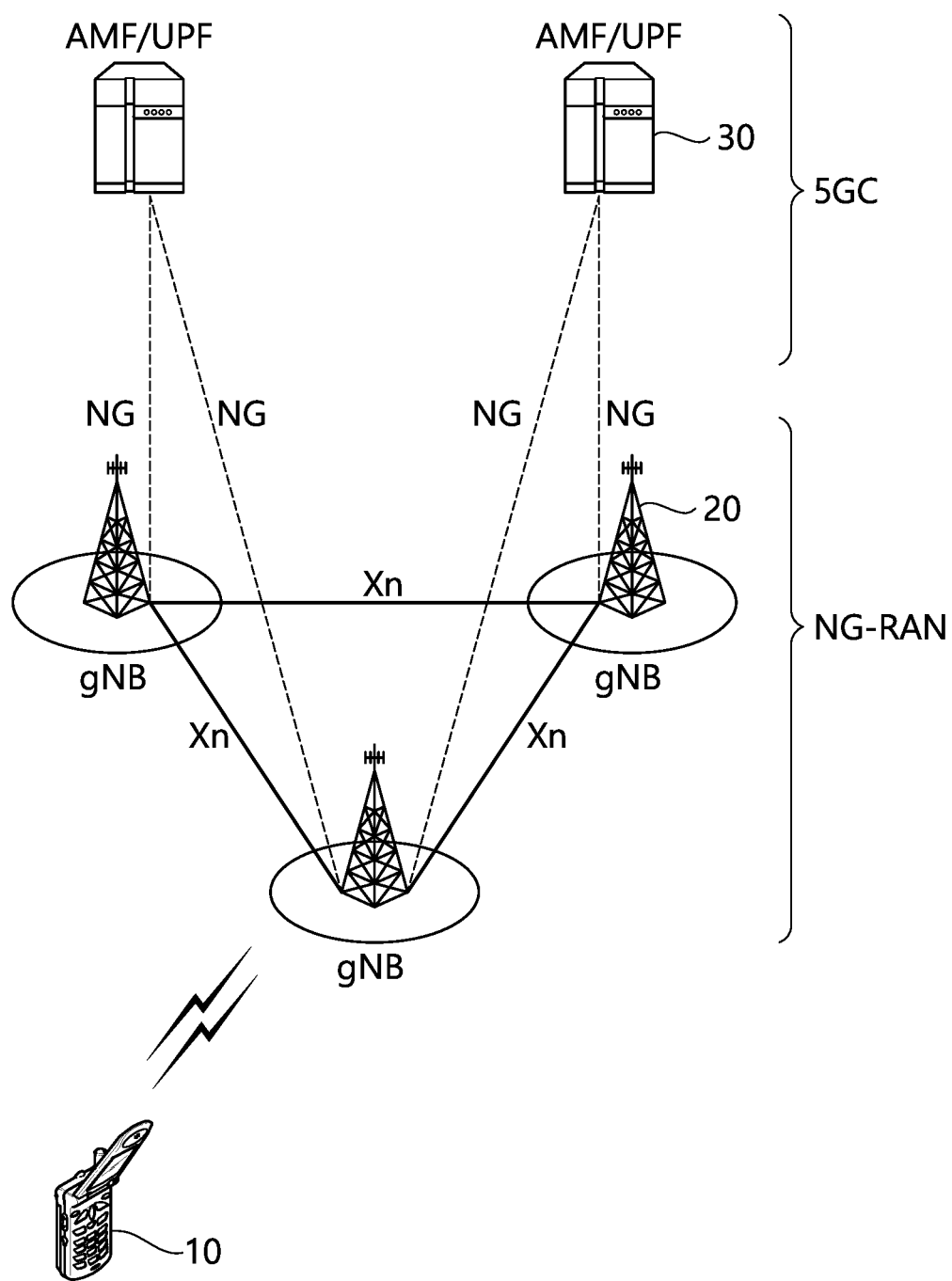
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
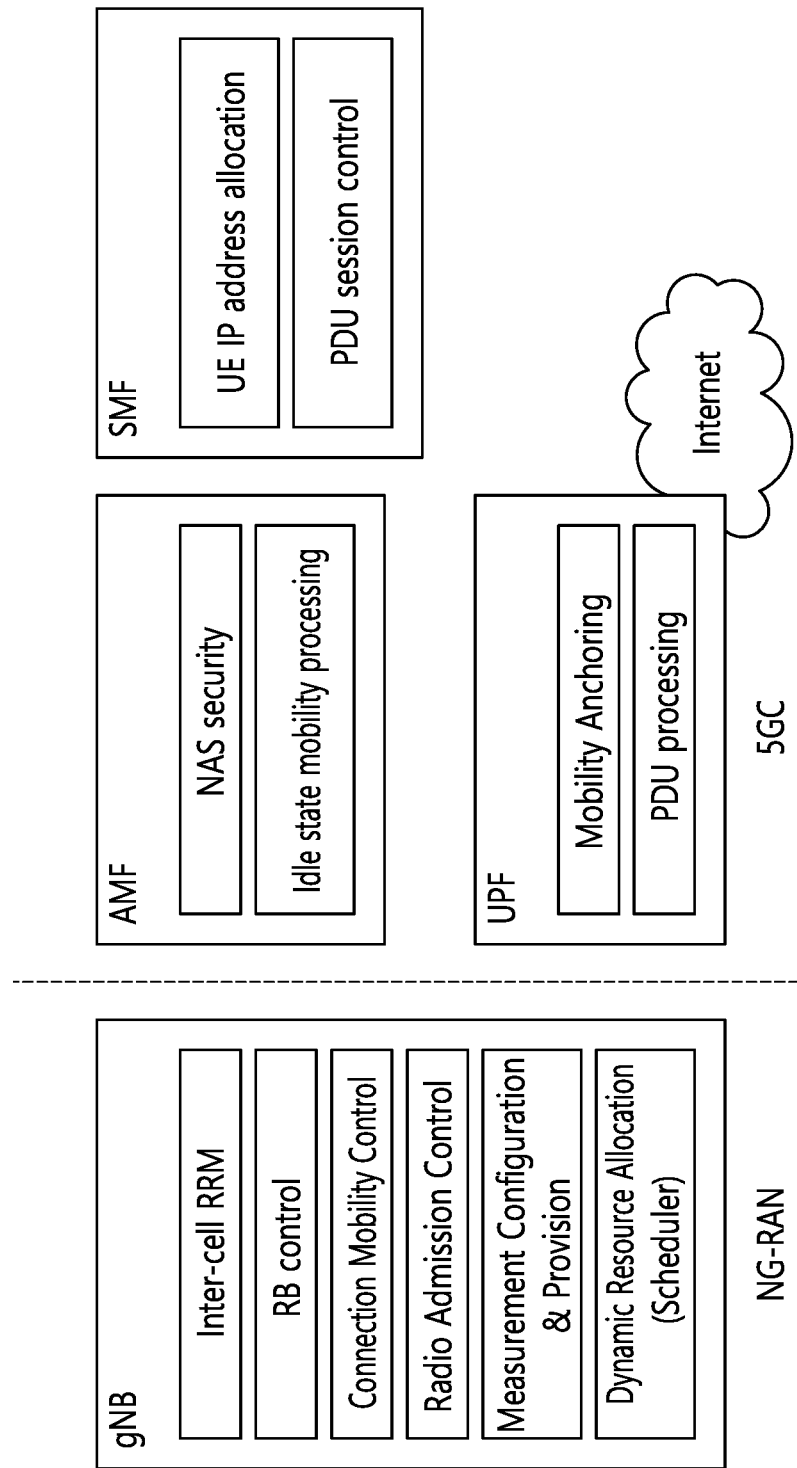
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
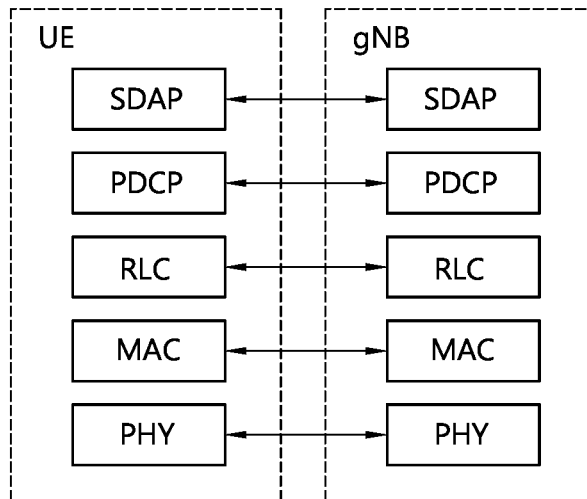
FIG. 4 shows a radio protocol architecture, in accordance with an embodiment of the present disclosure.
Figure 4:
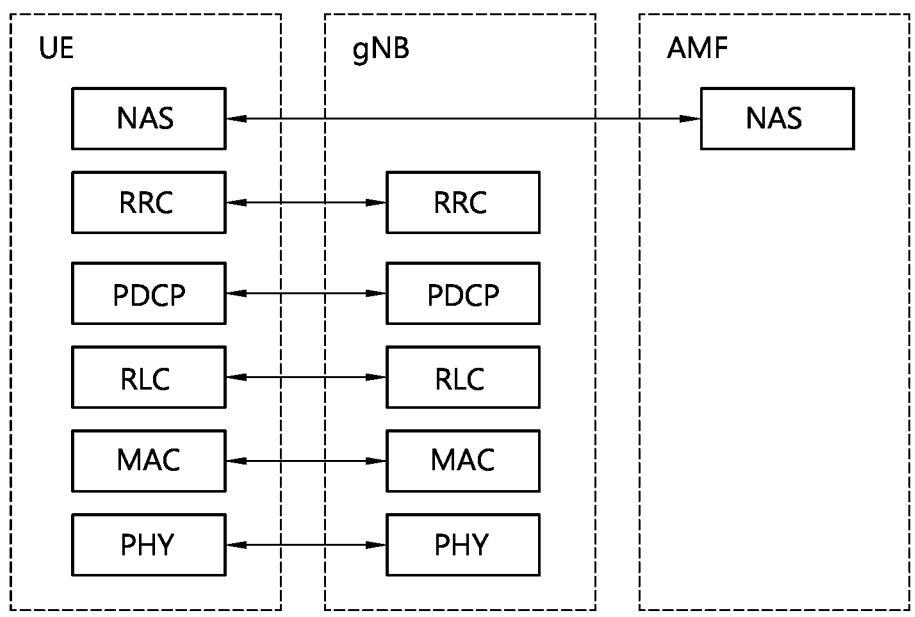

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
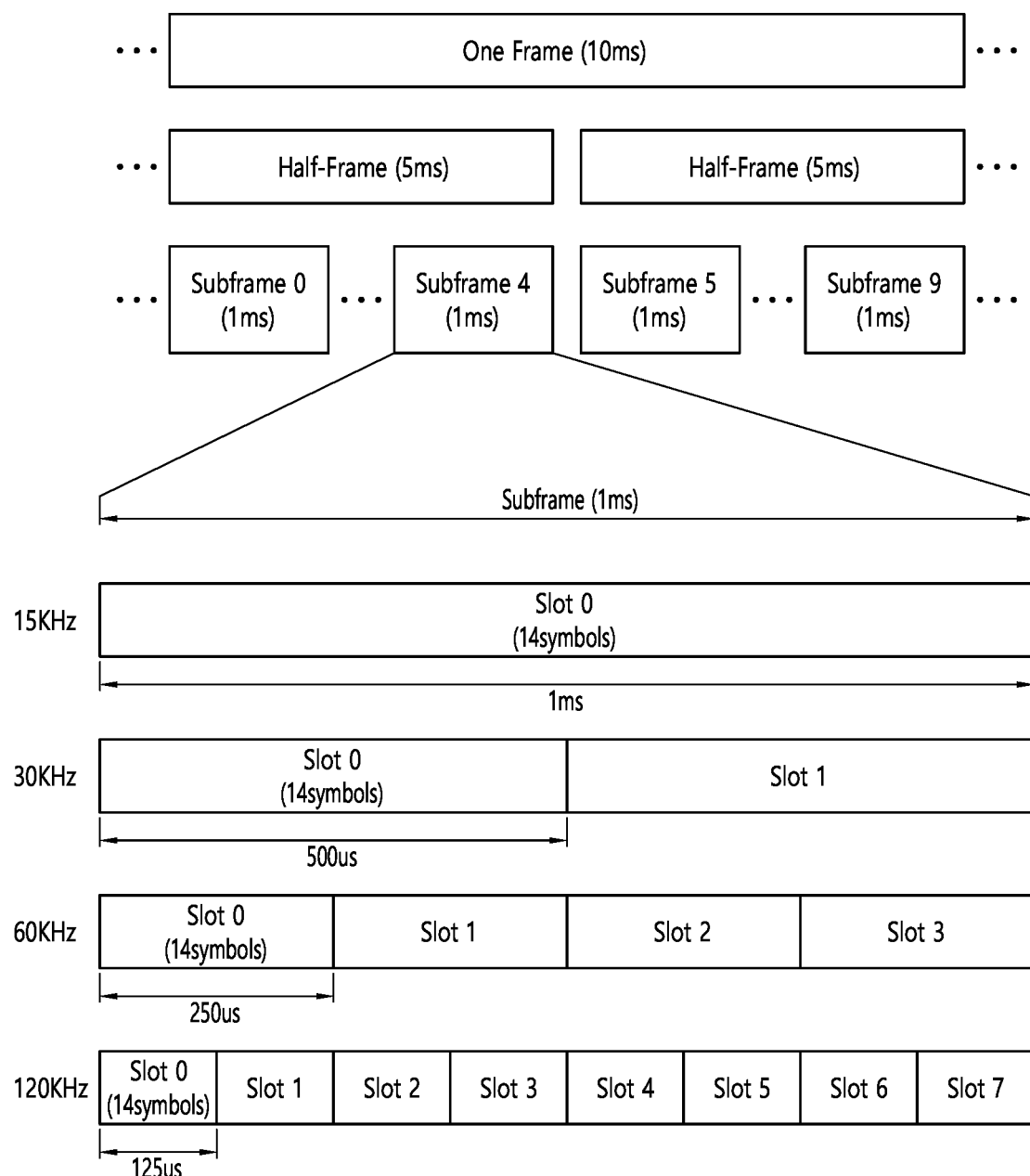
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 24) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise. An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
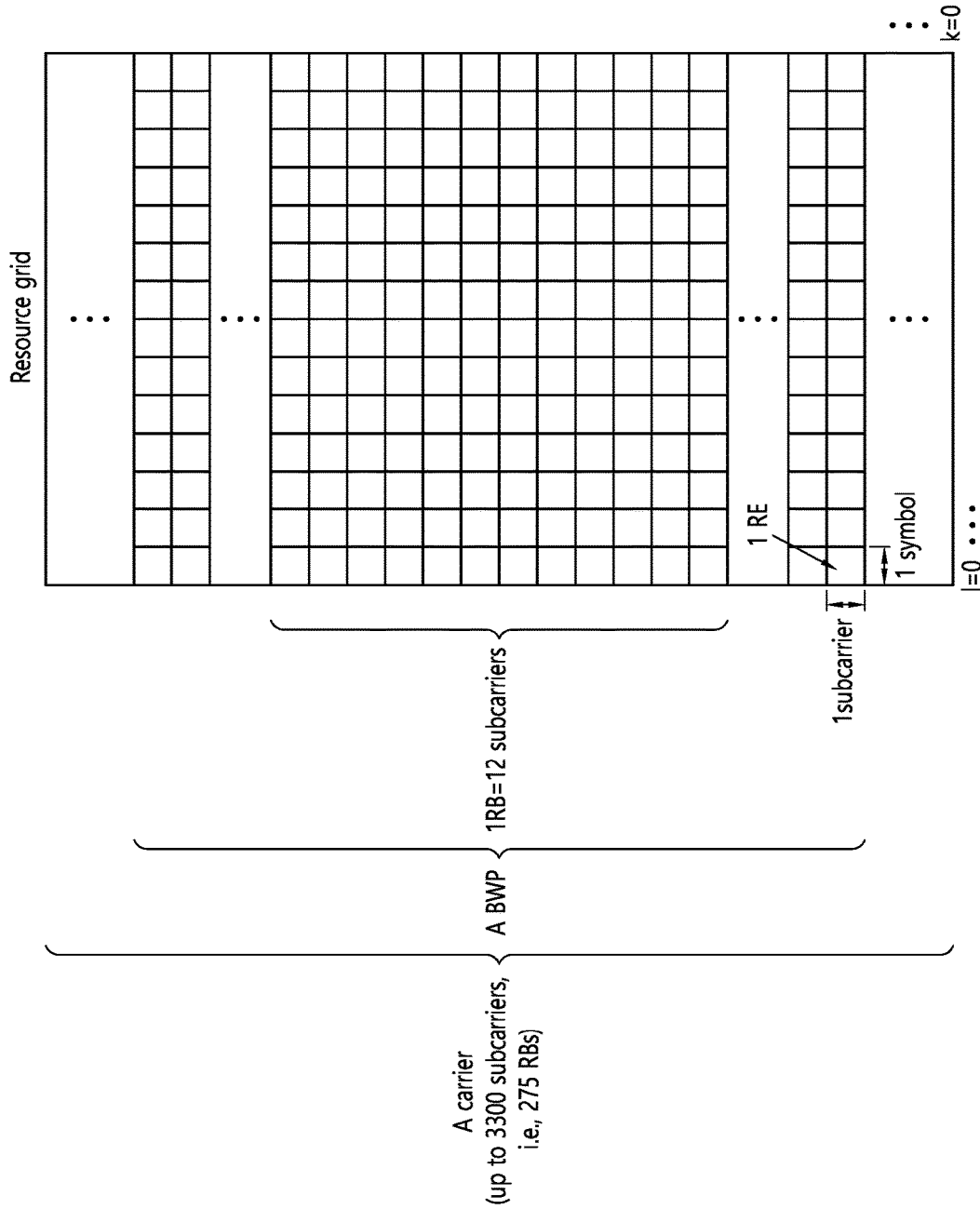
FIG. 6 shows a structure of a slot of an NR frame, in accordance with an embodiment of the present disclosure.

FIG. 6 shows a structure of a slot of an NR frame, in accordance with an embodiment of the present disclosure. The embodiment of FIG. 6 may be combined with various embodiments of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols. A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
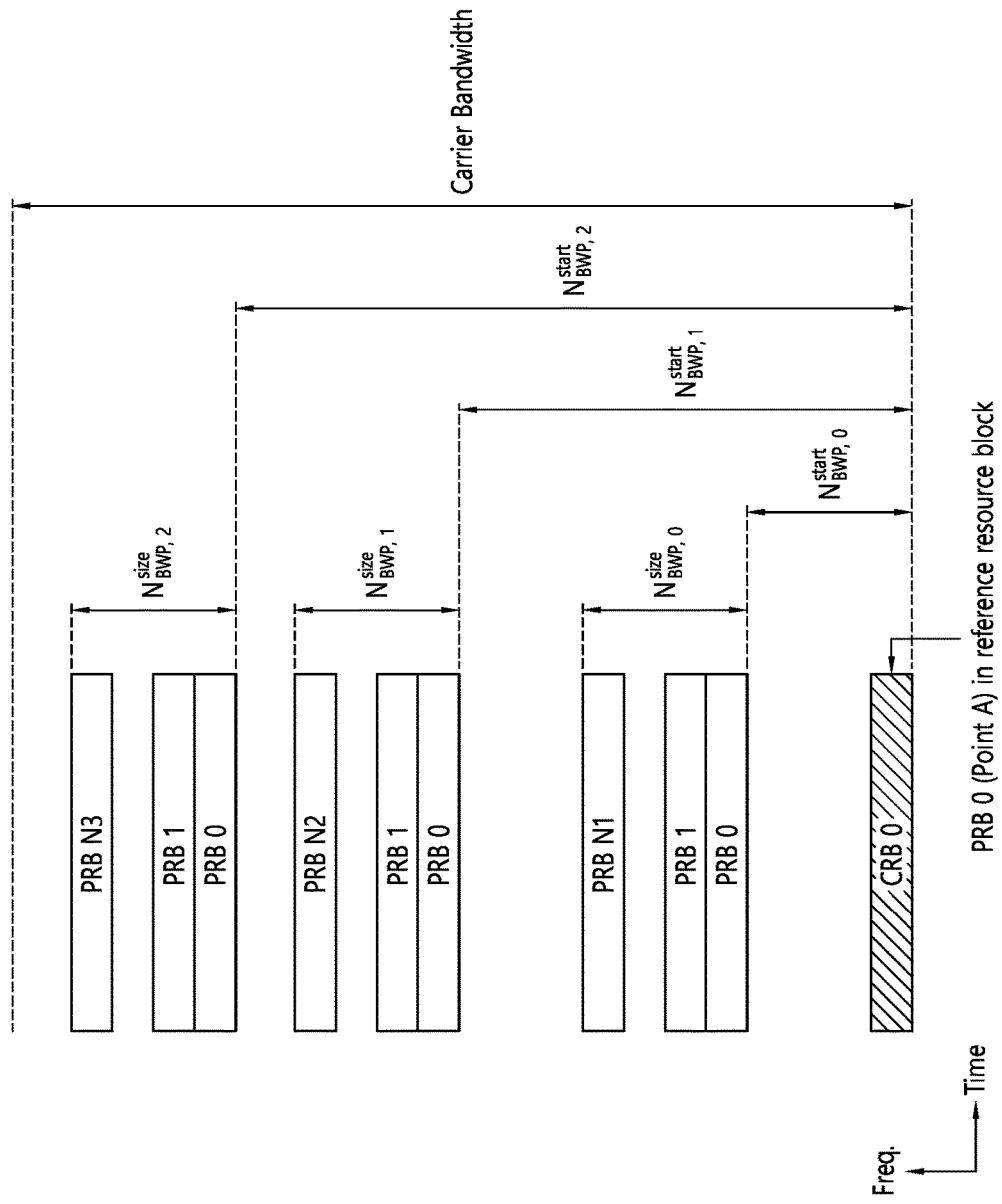
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
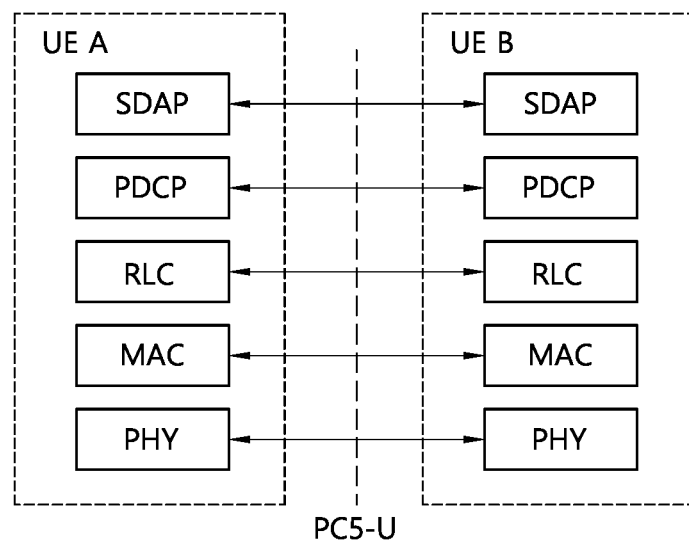
FIG. 8 shows a radio protocol architecture for a SL communication, in accordance with an embodiment of the present disclosure.
Figure 8:
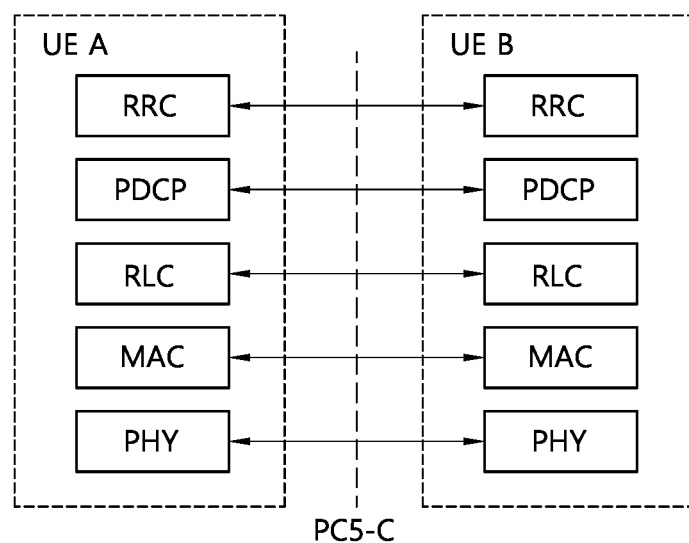

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
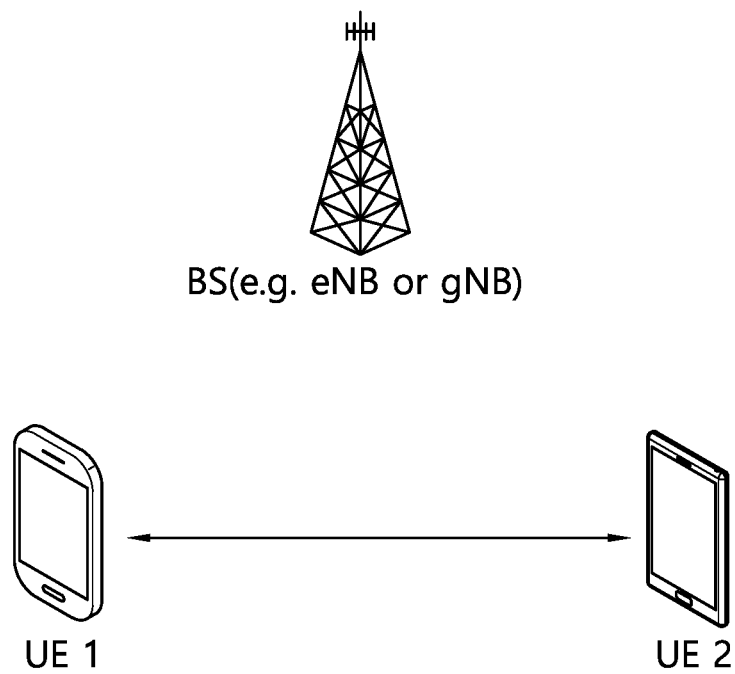
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
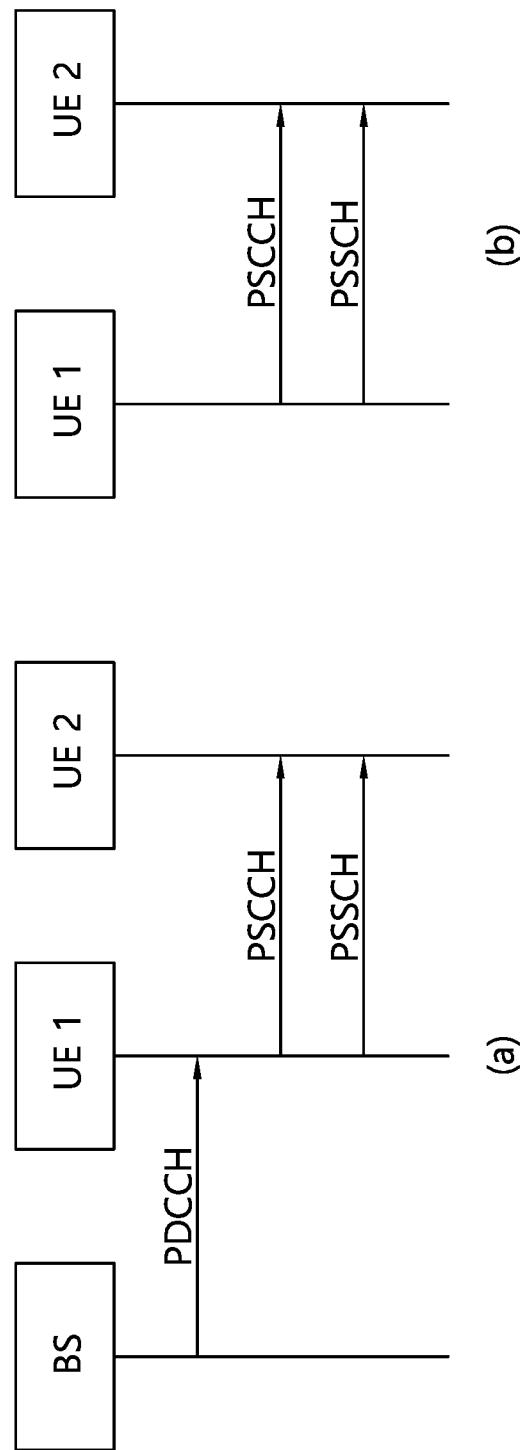
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
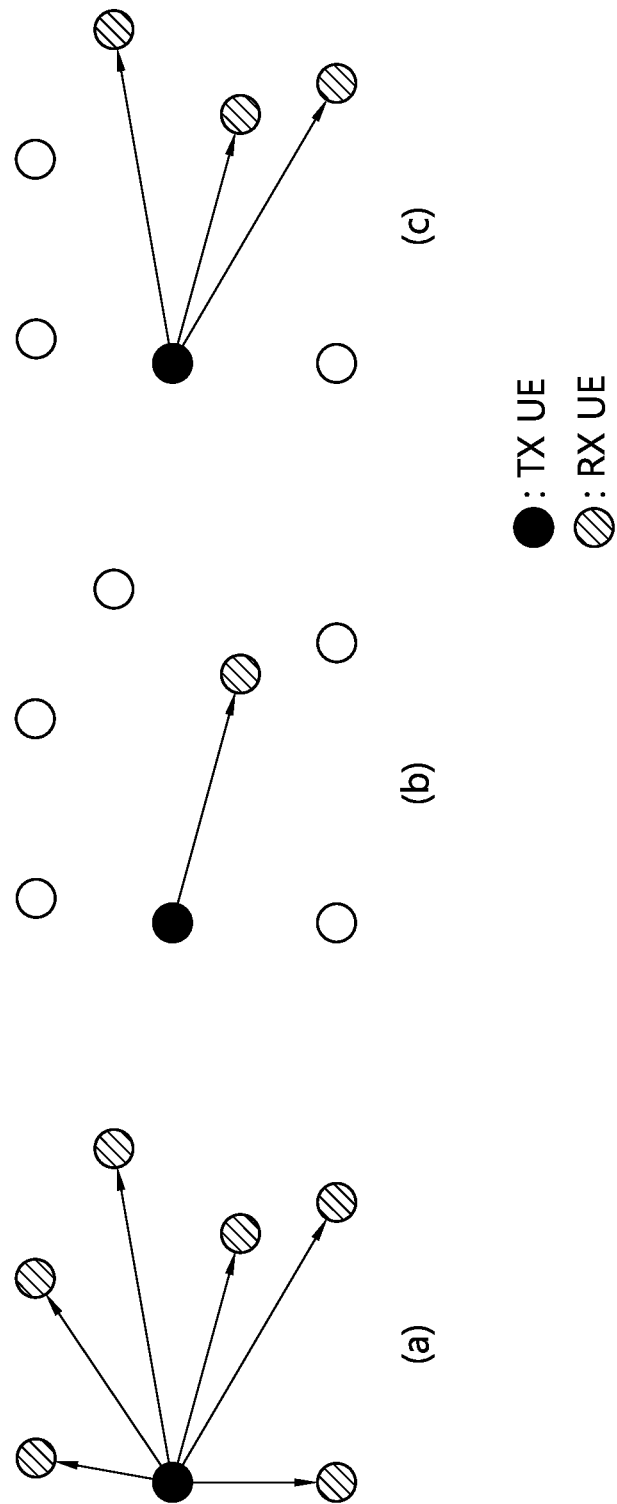
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(*a*) shows broadcast-type SL communication, FIG. 11(*b*) shows unicast type-SL communication, and FIG. 11(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, SL measurement and reporting will be described.

For the purpose of QoS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel state information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Meanwhile, in a next generation system, various usage cases may be supported. For example, services for communication of self-driving vehicles, smart cars or connected cars, and so on, may be considered. For such services, each vehicle may receive and send (or transmit) information as a user equipment capable of performing communication. And, depending upon the circumstances, each vehicle may select resources for communication with the help (or assistance) of the base station or without any help (or assistance) of the base station and transmit and receive messages to and from other UEs.

Meanwhile, in NR V2X, an inter-UE(user equipment) measurement/reporting mechanism based on a sidelink may be supported. For example, the measurement result between UEs may be used to perform AS layer link management, perform measurement-based Quality of Service (QoS) prediction, or perform link adaptation between UEs. On the Uu interface, a base station may configure a UE so that the UE performs measurement/reporting on a channel between the base station and the UE periodically or aperiodically. For example, the UE may measure the channel state using a reference signal (RS) transmitted by the base station and report the result to the base station. As in the case of the Uu interface, in V2X, inter-UE measurement/reporting may be performed. For example, in the measurement/reporting between UEs performed in V2X, a condition for triggering a sidelink-specific measurement/reporting performed for a channel related to communication between UEs may be required, separate from the condition that triggers aperiodic CSI (channel state information) (hereinafter, A-CSI) measurement/reporting performed by the UE for the base station on the Uu interface. Hereinafter, a method for measuring/reporting sidelink-specific A-CSI according to an A-CSI triggering condition and an apparatus supporting the same are proposed according to various embodiments of the present disclosure. Hereinafter, PC5 CSI measurement/reporting may be a measurement related to a channel state and a report of the measurement result. For example, PC5 CSI measurement/reporting may include A-CSI measurement/reporting.

Figure 12:
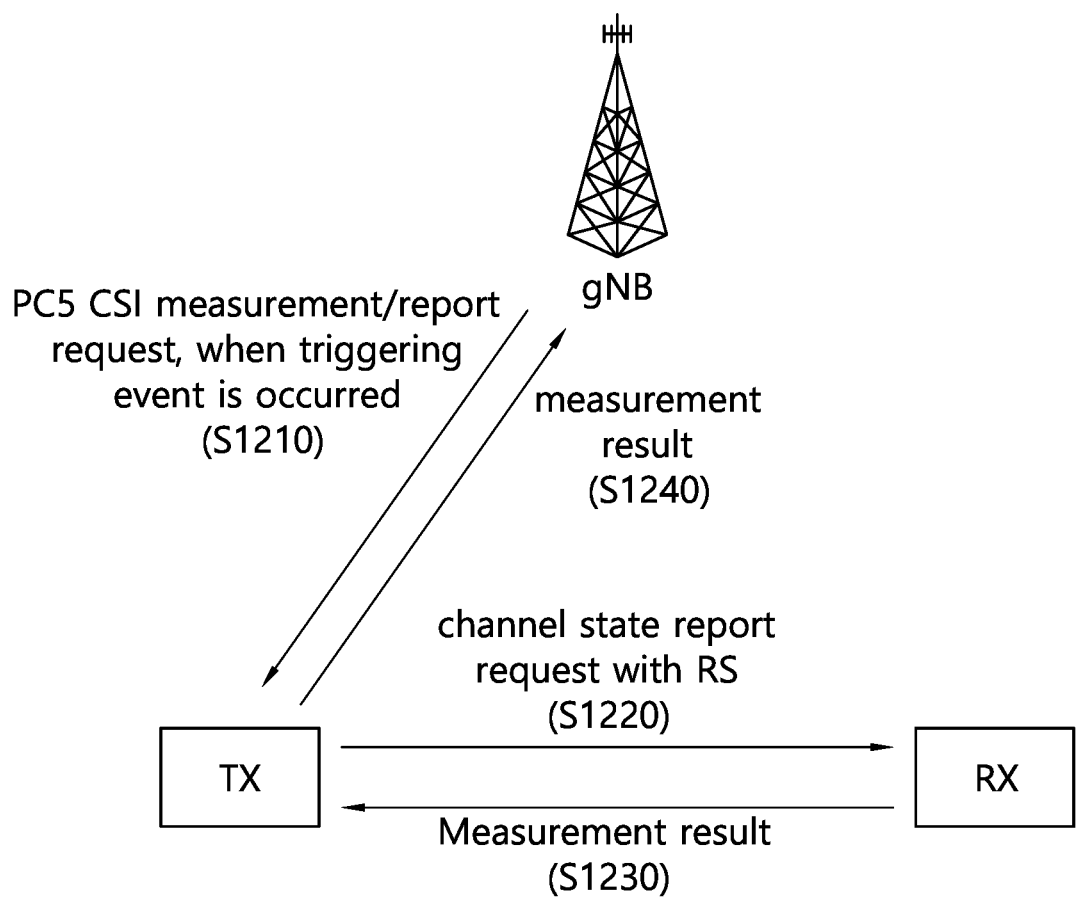
FIG. 12 shows a procedure in which a base station triggers PC5 CSI measurement/reporting, in accordance with an embodiment of the present disclosure.

FIG. 12 shows a procedure in which a base station triggers PC5 CSI measurement/reporting, in accordance with an embodiment of the present disclosure. The embodiment of FIG. 12 may be combined with various embodiments of the present disclosure. For example, a base station may transmit a request for channel state measurement/reporting to the first UE as in the case of the Uu interface. Also, the base station may perform configuration related to channel state measurement/reporting to the first UE. For example, the base station may transmit configuration information related to the channel state measurement/reporting to the first UE. For example, the base station may be a gNB.

Referring to FIG. 12, in step S1210, when a specific triggering condition is satisfied, the base station may request PC5 CSI measurement/reporting to the first UE. For example, the base station may transmit configuration information related to CSI measurement/reporting to the first UE. In step S1220, the first UE may request a channel state report from a second UE based on the configuration information received from the base station. For example, the configuration information may include information related to periodic measurement/reporting, information related to aperiodic measurement/reporting, reference signal (RS) type, reporting format, and the like. For example, the reporting format may include reference signal received power (RSRP). In this case, the first UE may transmit an RS to the second UE so that the second UE can measure. In step S1230, the second UE receiving the request for the channel state report may perform measurement related to the channel state based on the RS received from the first UE. And, the second UE may report the measurement result related to the channel state to the first UE. In step S1240, the first UE may report the measurement result received from the second UE to the base station. For example, the measurement result related to the channel state may include a CSI measurement/reporting result. For example, the base station may perform the next resource scheduling based on the measurement result reported from the first UE.

Figure 13:
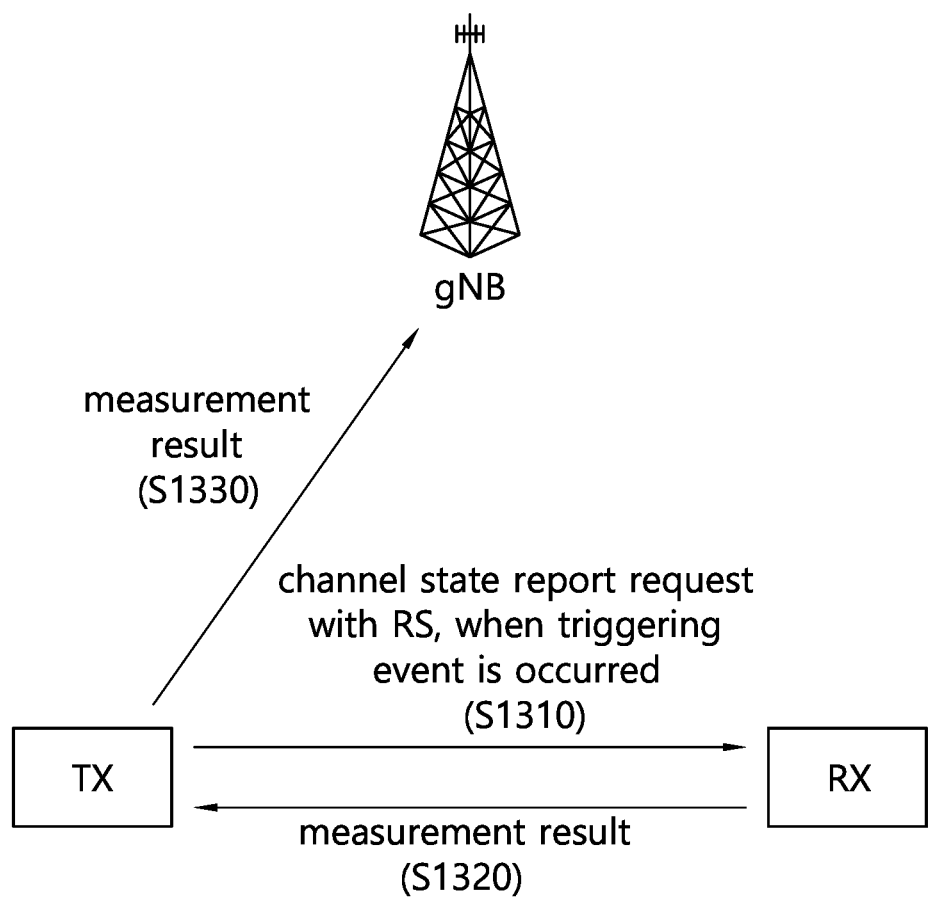
FIG. 13 shows a procedure for triggering PC5 CSI measurement/reporting by a first UE in accordance with an embodiment of the present disclosure.

FIG. 13 shows a procedure for triggering PC5 CSI measurement/reporting by a first UE in accordance with an embodiment of the present disclosure. The embodiment of FIG. 13 may be combined with various embodiments of the present disclosure.

Referring to FIG. 13, in step S1310, when a specific triggering condition is satisfied, a first UE may request a channel state report from a second UE. And, the first UE may trigger CSI measurement/reporting. For example, triggering may be an operation of transmitting a signal related to the start of a specific process. For example, in step S1310, the first UE may transmit an RS related to channel state measurement to the second UE. In step S1320, the second UE requested to report the channel state may perform the measurement related to the channel state based on the received RS related to the measurement of the channel state. And, the second UE may report the measurement result related to the channel state to the first UE. In step S1330, the first UE may report the measurement result received from the second UE to the base station. For example, the measurement result related to the channel state may be a CSI measurement/reporting result. For example, based on the measurement result reported from the first UE, the base station may perform the next resource scheduling.

According to an embodiment of the present disclosure, a first UE may not report a measurement result related to a channel state between UEs to a base station. In this case, it may be possible to design a more concise sidelink CSI measurement/reporting process by not reporting the measurement result related to the channel state between UEs to the base station.

Figure 14:
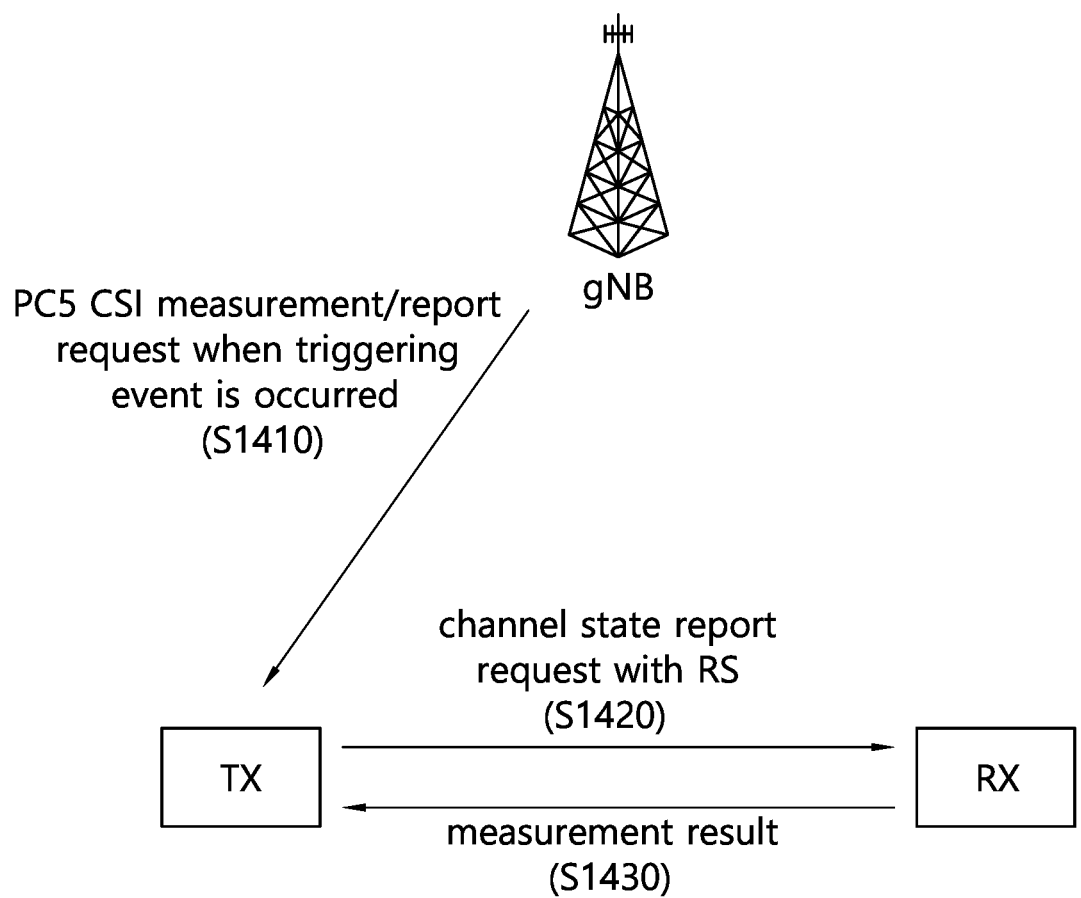
FIG. 14 shows a procedure in which a base station triggers PC5 CSI measurement/reporting, in accordance with an embodiment of the present disclosure.

FIG. 14 shows a procedure in which a base station triggers PC5 CSI measurement/reporting, in accordance with an embodiment of the present disclosure. The embodiment of FIG. 14 may be combined with various embodiments of the present disclosure.

Referring to FIG. 14, in step S1410, when a specific triggering condition is satisfied, a base station may request PC5 CSI measurement/reporting to a first UE. For example, in step S1410, the base station may transmit configuration information for CSI measurement/reporting to the first UE. For example, the configuration information may include information related to periodic measurement/reporting or information related to aperiodic measurement/reporting, RS type, reporting format, and the like. For example, the reporting format may include RSRP. In step S1420, the first UE may request a channel state report to the second UE. In addition, the first UE may transmit an RS related to channel state measurement to the second UE. In step S1430, the second UE may perform measurement related to the channel state based on the received configuration information and RS. And, the second UE may report the measurement result related to the channel state to the first UE. For example, the measurement result related to the channel state may be a CSI measurement/reporting result.

Figure 15:
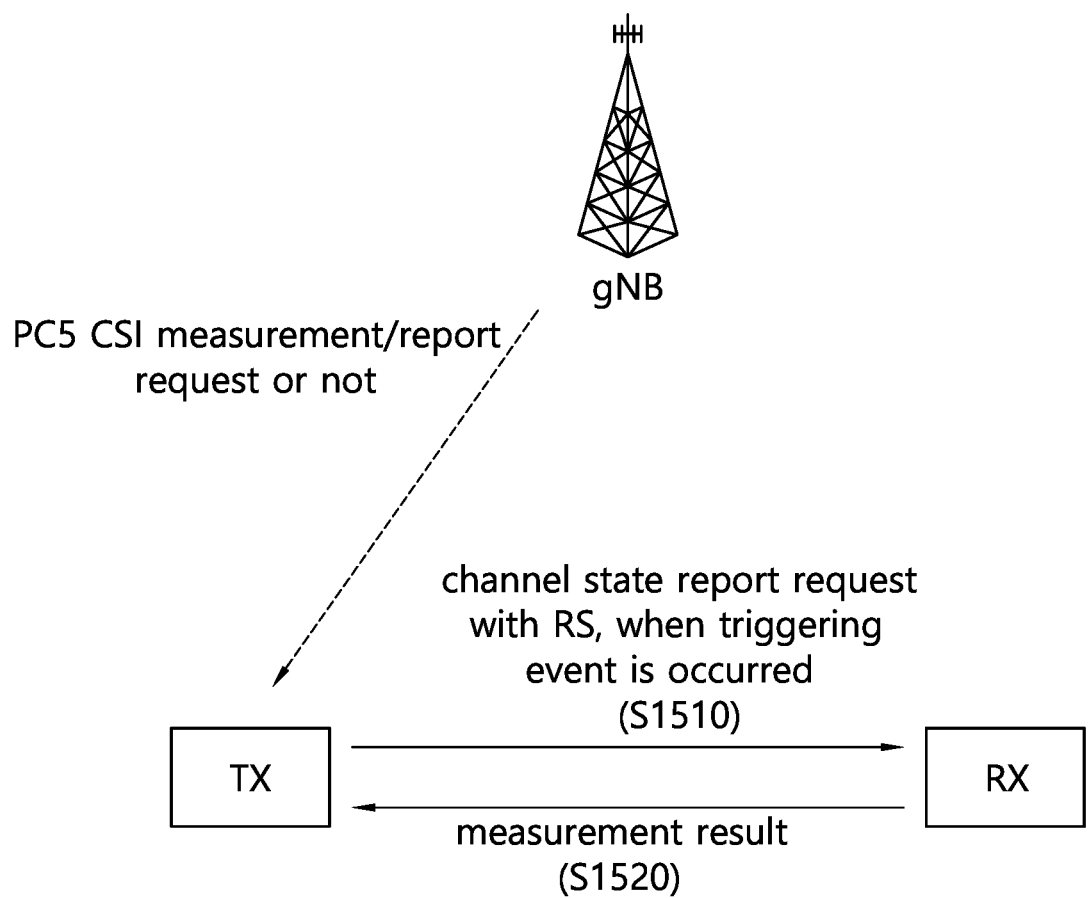
FIG. 15 shows a procedure for triggering PC5 CSI measurement/reporting by a first UE in accordance with an embodiment of the present disclosure.

FIG. 15 shows a procedure for triggering PC5 CSI measurement/reporting by a first UE in accordance with an embodiment of the present disclosure. The embodiment of FIG. 15 may be combined with various embodiments of the present disclosure.

For example, referring to FIG. 15, in a PC5 CSI measurement/reporting triggering process, a base station may not make a PC5 CSI measurement/report request to a first UE. In this case, in the PC5 CSI measurement/reporting triggering process, since the first UE does not report a measurement result related to the channel state between UEs to the base station, the involvement of the base station can be minimized For example, in the process of triggering PC5 CSI measurement/report, the base station may request PC5 CSI measurement/reporting to the first UE. In step S1510, when a specific triggering condition is satisfied, the first UE may request a channel state report to a second UE. For example, the first UE may transmit an RS related to the measurement of the channel state to the second UE. In step S1520, the second UE may perform measurement related to the channel state based on the RS. And, the second UE may report the measurement result related to the channel state to the first UE. For example, the measurement result related to the channel state may be a CSI measurement/reporting result. For example, the measurement result related to the channel state may be used for resource (re)selection between PC5 connections, connection adaptation, power control, and the like. For example, in the PC5 CSI measurement/reporting triggering procedure according to FIG. 15, the first UE may perform configuration related to channel state measurement. For example, the first UE may transmit configuration information related to the configuration to the second UE.

In the example shown in FIGS. 12 to 15, the first UE may be set to a mode in which resource allocation is received from a base station. For example, when the first UE is set to a mode for receiving resource allocation from the base station, the first UE may be allocated a resource for CSI measurement/reporting request and/or a resource for CSI report from the base station. For example, the first UE may transmit a scheduling request (SR) to the base station. For example, the first UE may transmit a Buffer Status Report (BSR) to the base station. For example, the first UE may receive a resource grant from the base station. For example, resources for sidelink communication of the first UE may be allocated through the above process. In addition, the first UE may perform sidelink communication based on the resource grant.

In the above, a schematic sidelink-specific CSI measurement/reporting procedure was shown and described. Below, during the above process, a triggering condition for causing a first UE to request A-CSI measurement/reporting from a second UE and a specific method for the first UE to report a measurement result related to a channel state, received from the second UE, to a base station, and an apparatus supporting the same are proposed.

For example, a first UE performing NR V2X communication may perform mode 1 communication. When the first UE performs communication in mode 1, among the resources allocated by a base station to the first UE, there may be an A-CSI measurement/reporting triggering condition related to a resource used for sidelink retransmission of the first UE. For example, the resource allocated from the base station may include an initial Tx resource and a re-Tx resource.

For example, a first UE performing NR V2X communication may perform mode 2 communication. When the first UE performs communication in mode 2, among the resources selected by the first UE, there may be an A-CSI measurement/reporting triggering condition related to a reserved Tx resource for retransmission. For example, the resource selected by the first UE may include an initial transmission resource and a transmission resource reserved for retransmission.

For example, when a first UE performing NR V2X communication performs mode 1 communication, the first UE may be allocated a transmission resource and a retransmission resource. When the first UE performs mode 1 communication, a base station or the first UE may trigger A-CSI measurement/reporting in relation to the allocated retransmission resource. For example, when the first UE performing NR V2X communication performs mode 1 communication, the base station may allocate resources to the first UE through a resource grant. Here, the resource grant may be related to an initial transmission resource and a retransmission resource. The first UE performs PC5 communication with a second UE using the allocated resources, and receives HARQ information for data transmitted by the first UE from the second UE. For example, the HARQ information may include acknowledgment (ACK) or negative acknowledge (NACK).

Figure 16:
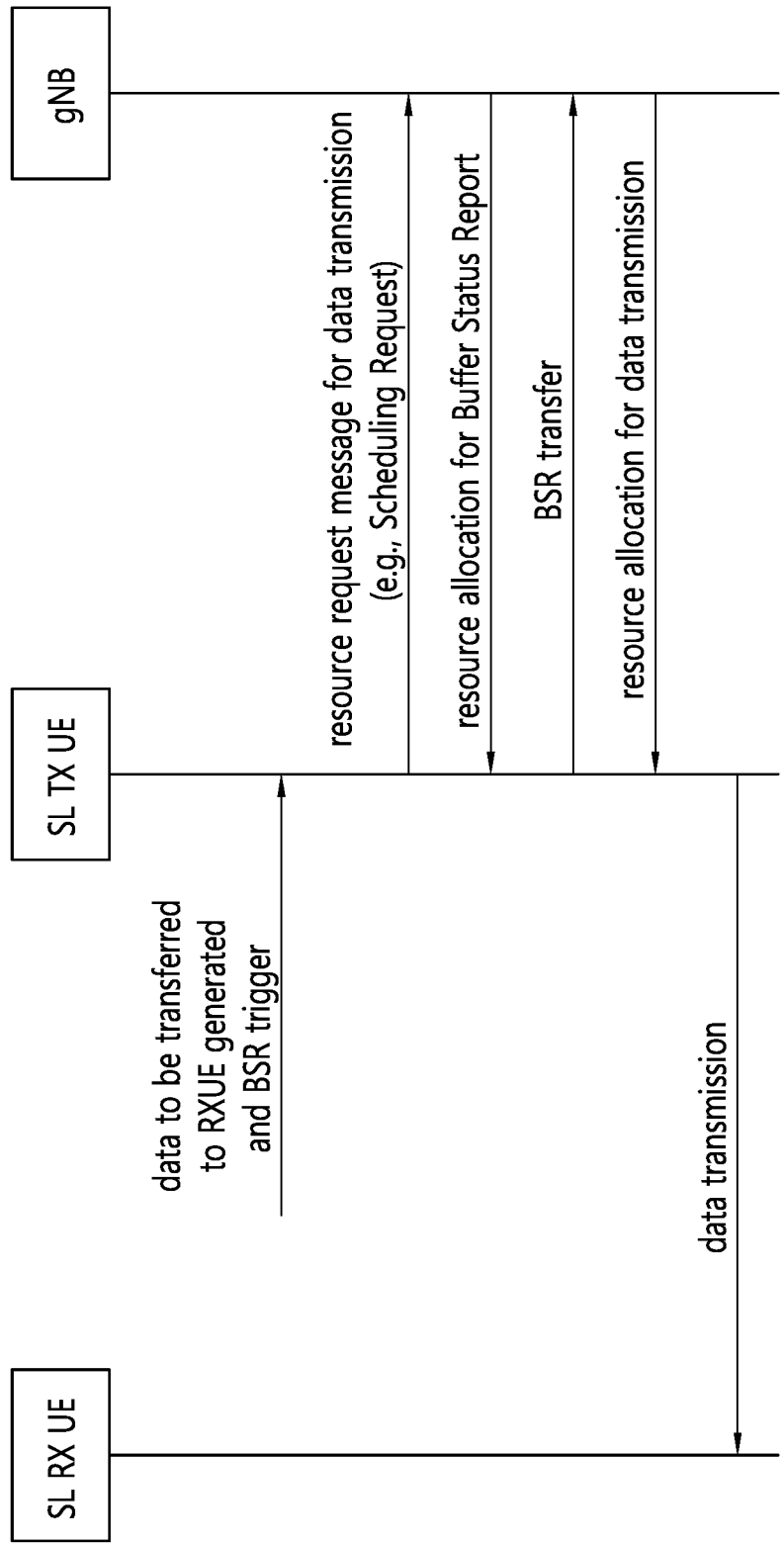
FIG. 16 shows a procedure in which a first UE receives resource allocation in an NR configured grant scheme in accordance with an embodiment of the present disclosure.
Figure 17:
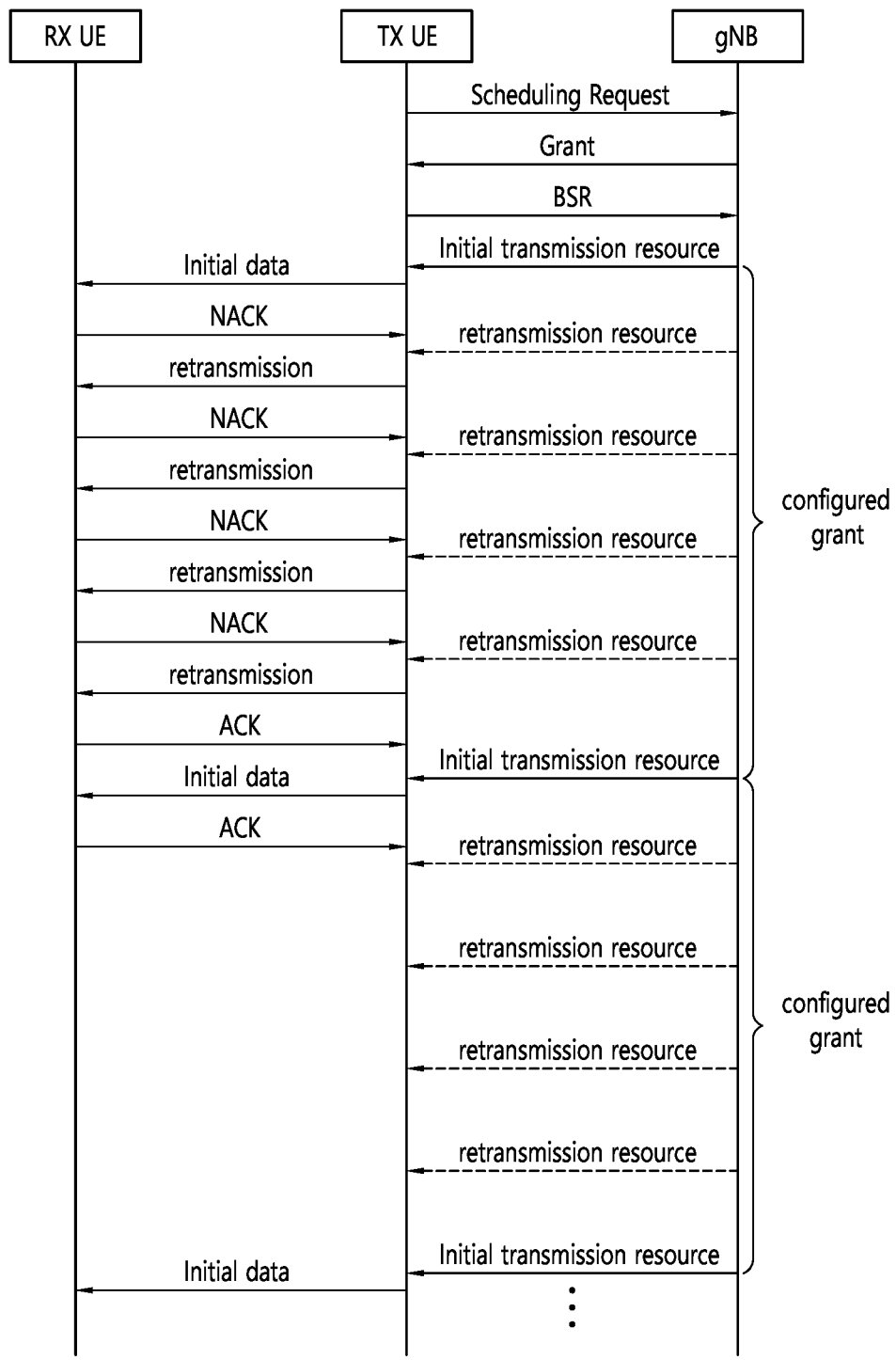
FIG. 17 shows a procedure for performing transmission and retransmission by a first UE to which a resource is allocated according to an NR configured grant method, based on the resource and feedback of a second UE, in accordance with an embodiment of the present disclosure.

FIG. 16 shows a procedure in which a first UE receives resource allocation in an NR configured grant scheme in accordance with an embodiment of the present disclosure. FIG. 17 shows a procedure for performing transmission and retransmission by a first UE to which a resource is allocated according to an NR configured grant method, based on the resource and feedback of a second UE, in accordance with an embodiment of the present disclosure. FIGS. 16 and 17 may be combined with various embodiments of the present disclosure.

Referring to FIG. 17, for example, a first UE may be allocated a resource in a configured grant method of NR. For example, a retransmission resource may be allocated 4 times. For example, upon receiving a NACK from a second UE, the first UE may retransmit to the second UE using the allocated retransmission resource. The second UE may transmit the NACK feedback for each of the initial transmission and the first to third retransmissions of the first UE, and transmit the ACK feedback for the last fourth retransmission. For example, in this case, since the first UE uses all four allocated retransmission resources, it can be seen that the retransmission resources have been appropriately allocated from the base station. For example, when the first UE performs sidelink retransmission using the last retransmission resource, when the first UE receives the ACK for the sidelink retransmission from the second UE retransmission resources may have been appropriately allocated. For example, when the retransmission resource is appropriately allocated, the first UE or the base station may not trigger the A-CSI measurement/report.

Figure 18:
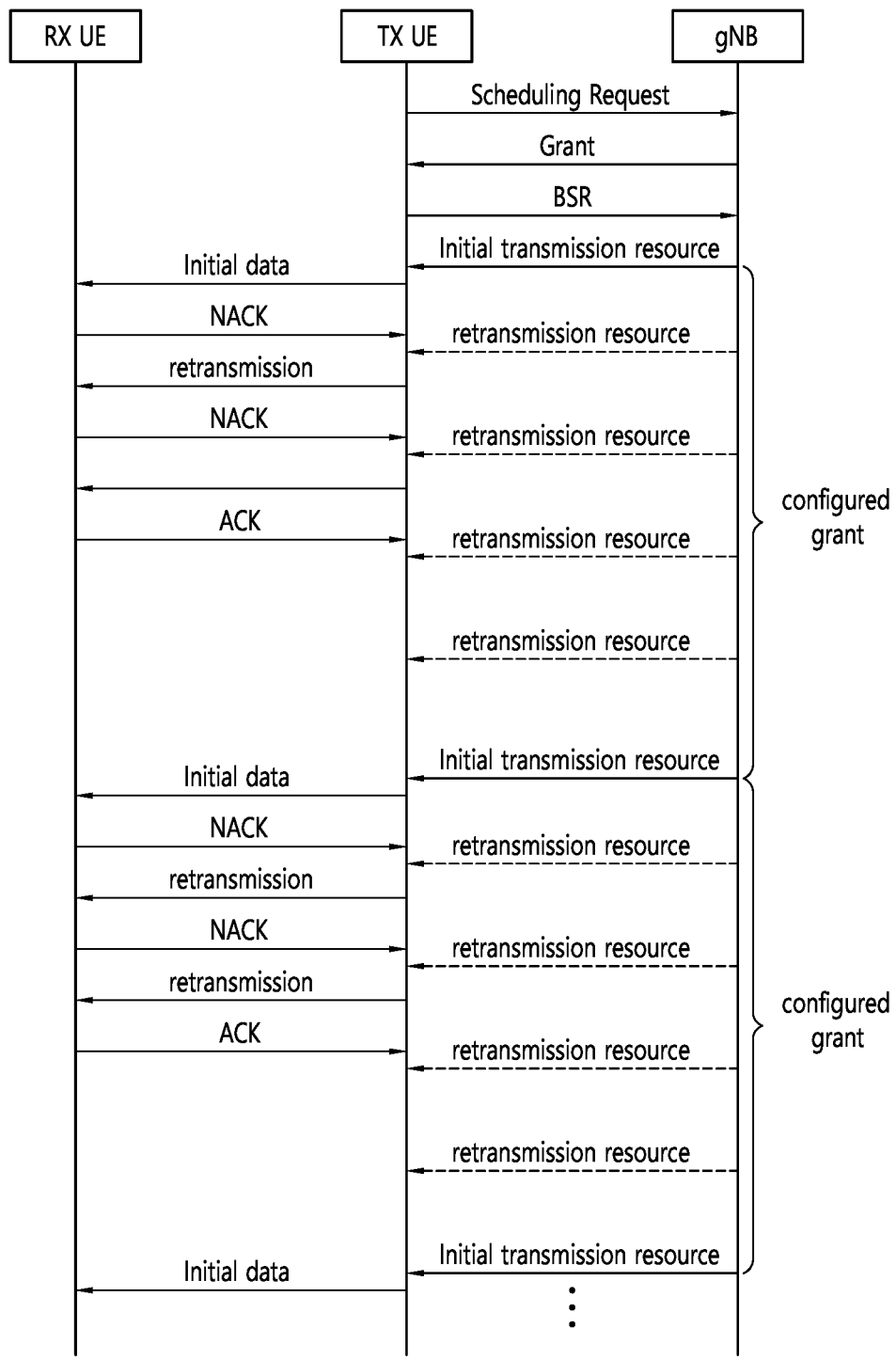
FIG. 18 shows a procedure in which a first UE allocated with a resource according to an NR configured grant scheme performs transmission and retransmission based on a resource and feedback of a second UE, in accordance with an embodiment of the present disclosure.

FIG. 18 shows a procedure in which a first UE allocated with a resource according to an NR configured grant scheme performs transmission and retransmission based on a resource and feedback of a second UE, in accordance with an embodiment of the present disclosure. FIG. 18 may be combined with various embodiments of the present disclosure.

Referring to FIG. 18, for example, a first UE may be allocated 4 retransmission resources. For example, if the first UE fails to use all of the allocated four retransmission resources for retransmission, and receives ACK feedback from a second UE on the way and subsequent retransmission resources are not used, a waste of resources may occur. For example, when the first UE fails to use all of the allocated four retransmission resources for retransmission, and receives ACK feedback from the second UE on the way, and subsequent retransmission resources are not used, it may be a case in which a base station does not properly understand the channel state between UEs performing sidelink communication, and retransmission resources are excessively allocated. For example, when the first UE performs sidelink retransmission using a retransmission resource prior to the last retransmission resource, when the first UE receives the ACK for the sidelink retransmission from the second UE, the retransmission resource may be excessively allocated. For example, when retransmission resources are excessively allocated, the first UE or the base station may trigger A-CSI measurement/reporting.

Figure 19:
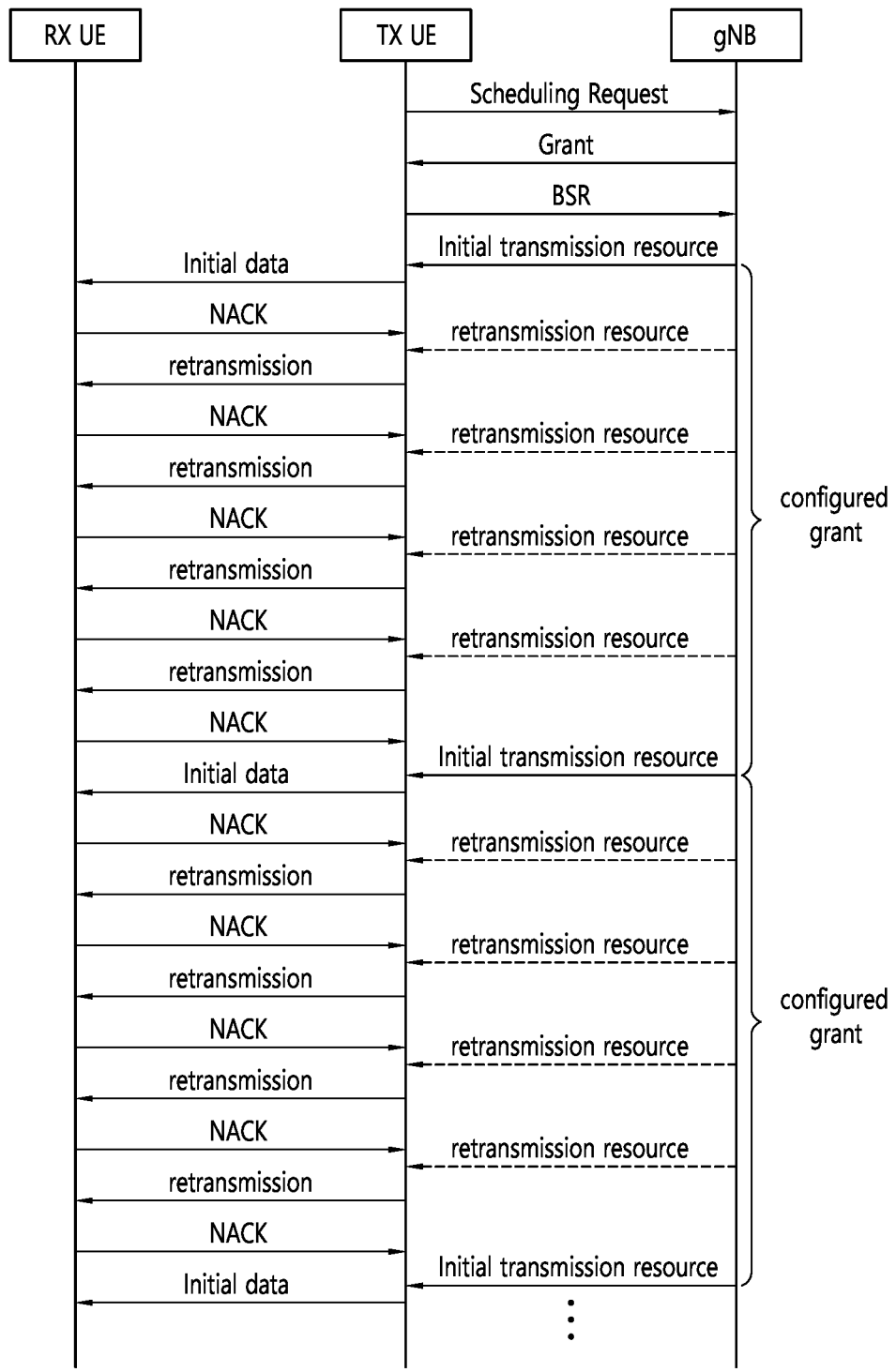
FIG. 19 shows a procedure for performing transmission and retransmission by a first UE to which a resource is allocated according to an NR configured grant method, based on the resource and feedback of a second UE, in accordance with an embodiment of the present disclosure.

FIG. 19 shows a procedure for performing transmission and retransmission by a first UE to which a resource is allocated according to an NR configured grant method, based on the resource and feedback of a second UE, in accordance with an embodiment of the present disclosure. The embodiment of FIG. 19 may be combined with various embodiments of the present disclosure.

Referring to FIG. 19, for example, a first UE may be allocated 4 retransmission resources. For example, when the first UE retransmits using all four allocated retransmission resources and receives a NACK for the last retransmission from a second UE, it may be a case in which a base station insufficiently allocates retransmission resources. For example, when the first UE performs sidelink retransmission using the last retransmission resource, when the first UE receives the NACK for the sidelink retransmission from the second UE, it may be a case in which retransmission resources are insufficiently allocated. When the retransmission resource is insufficiently allocated, the first UE or the base station may trigger A-CSI measurement/reporting.

For example, as described above, when the base station fails to properly determine the channel state between UEs and thus fails to properly allocate retransmission resources, unused resources may occur and waste of radio communication resources may occur. Or, a disadvantage of occurrence of delay may occur because the first UE performs retransmission after being allocated another retransmission resource again. For example, when disadvantages such as waste of communication resources or communication delay occur due to failure to properly allocate retransmission resources, the base station or the first UE needs to determine an appropriate channel state through an A-CSI measurement/reporting procedure. Therefore, the A-CSI measurement/reporting triggering condition may include a case that the first UE succeeds in transmission using less resources than the retransmission resources allocated from the base station and/or a case that the first UE fails to transmit even though retransmission is performed using all the allocated retransmission resources. For example, the subject of A-CSI measurement/reporting triggering may be the first UE. For example, the first UE may directly trigger the A-CSI measurement/reporting to the second UE. For example, as shown in FIG. 12, when the A-CSI measurement/reporting triggering condition is satisfied, a first UE may notify a base station of this. For example, the subject of A-CSI measurement/reporting triggering may be the base station.

In the above, the triggering conditions according to the allocated retransmission resources and the number of retransmissions have been described. Hereinafter, a process for triggering A-CSI measurement/reporting by a base station or a first UE, including the triggering condition suggested above, and an apparatus supporting the same are proposed. First, in accordance with an embodiment of the present disclosure, the base station may be the subject of A-CSI measurement/reporting triggering between UEs.

Figure 20:
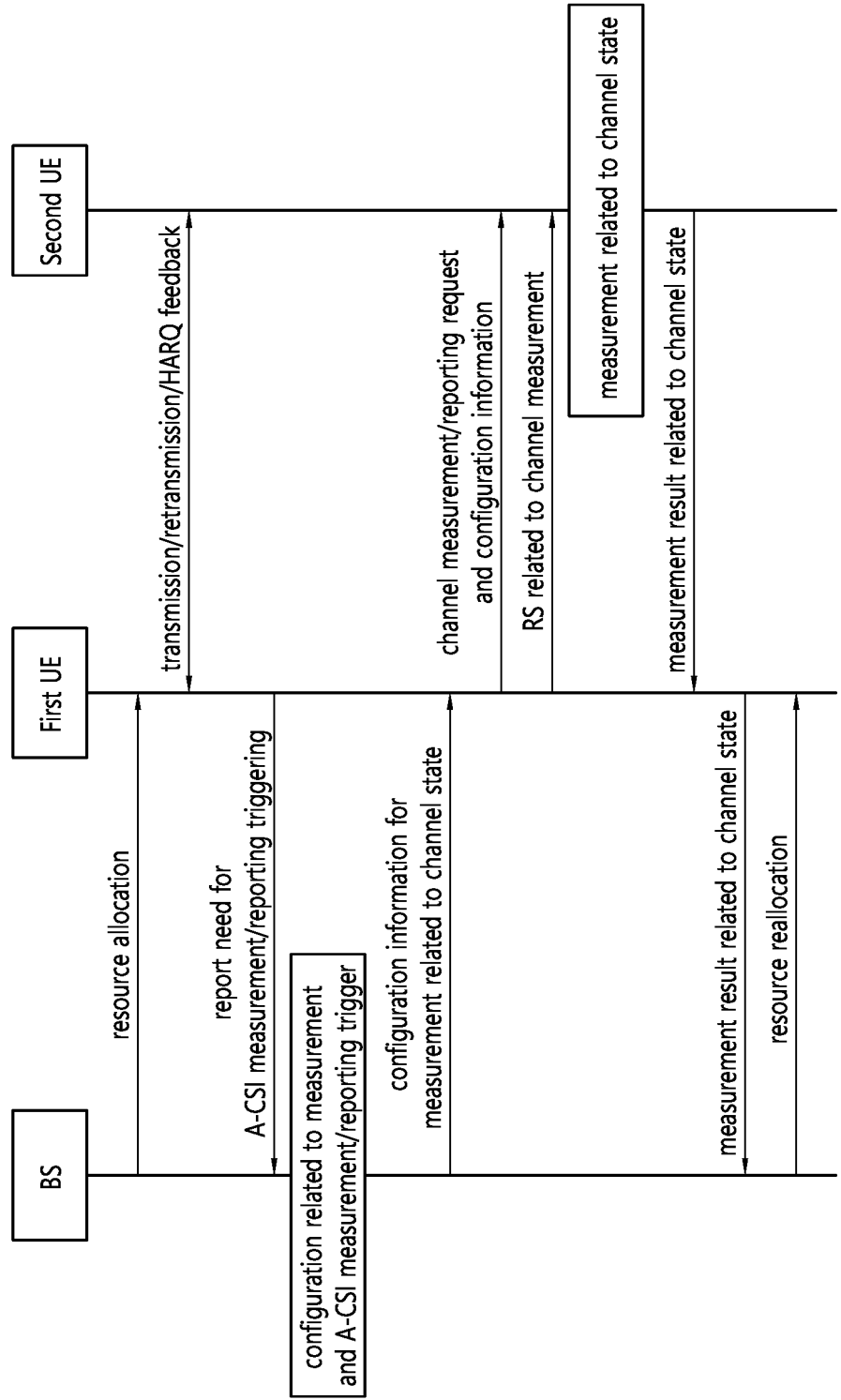
FIG. 20 shows an A-CSI measurement/reporting triggering procedure performed by a base station in accordance with an embodiment of the present disclosure.

FIG. 20 shows an A-CSI measurement/reporting triggering procedure performed by a base station in accordance with an embodiment of the present disclosure. The embodiment of FIG. 20 may be combined with various embodiments of the present disclosure.

1. A-CSI Measurement/Reporting Triggering Process Performed by a Base Station

1) For example, a base station may transmit a resource grant to a first UE based on a SR and a BSR received from the first UE. The base station may allocate resources to the first UE through the resource grant. In this case, the base station may allocate the resource to the first UE in the configured grant method of NR. For example, the first UE may be allocated N times the retransmission resources among the general transmission resources from the base station.

2-1) For example, the first UE may retransmit by using all of the N-th retransmission resources allocated from the base station, and may receive a NACK for the N-th retransmission. For example, in a case that the first UE retransmits using all of the N-th retransmission resources allocated from the base station, and the first UE receives a NACK for the N-th retransmission, it may be a case in which the base station allocates a small amount of retransmission resources, and an additional retransmission resource request may be required. For example, when the base station allocates a small amount of retransmission resources, the A-CSI measurement/reporting triggering condition may be satisfied. For example, when the first UE performs sidelink retransmission using the last retransmission resource among the retransmission resources, and the first UE receives NACK information from the second UE in response to the sidelink retransmission, a condition of A-CSI measurement/reporting triggering may be satisfied. For example, when the first UE performs sidelink retransmission using the last retransmission resource among the retransmission resources, and the first UE receives NACK information from the second UE in response to the sidelink retransmission, a condition of A-CSI measurement/reporting triggering may be satisfied. For example, the first UE may determine that the condition of A-CSI measurement/reporting triggering is satisfied.

2-2) For example, the first UE does not use all of the N retransmission resources allocated from the base station, performs retransmission using fewer resources than the N retransmission resources, and may receive an ACK for the last retransmission. For example, when the first UE does not use all of the N retransmission resources allocated from the base station, the first UE retransmits using less resources than the N times of retransmission resources, and the first UE receives the ACK for the last retransmission, tt may be a case in which the base station over-allocates retransmission resources. For example, the first UE may have performed retransmissions N−1 times or N−2 times. When the first UE performs retransmission of N−1 times or N−2 times, the condition of triggering A-CSI measurement/reporting may be satisfied. For example, the first UE may determine that the condition of A-CSI measurement/reporting triggering is satisfied. For example, the first UE may perform sidelink retransmission using a retransmission resource prior to the last retransmission resource among the retransmission resources, and the first UE may receive ACK information from the second UE in response thereto.

3) For example, when the situation of 2-1) or 2-2) occurs, the first UE may report the need for A-CSI measurement/reporting triggering to the base station. For example, the first UE may transmit information related to the satisfaction of the A-CSI measurement/reporting triggering condition to the base station.

4) For example, the base station may trigger A-CSI measurement/reporting between UEs. The base station may perform configuration for A-CSI measurement/reporting. For example, the base station may transmit configuration information related to the configuration to the first UE. For example, the configuration information may include a report type, an RS type, a resource used for reporting, and a reporting quantity.

5) For example, the first UE may transmit a channel measurement/reporting request to the second UE. In addition, setting information related to measurement of a channel state may be transmitted. For example, the first UE may transmit an RS related to the measurement of the channel state to the second UE. The channel measurement/reporting may be A-CSI measurement/report.

6) For example, the second UE may perform measurement related to the channel state based on the received RS. The second UE may transmit the measurement result related to the channel state to the first UE.

7) For example, the first UE may transmit the received measurement result to the base station.

8) For example, the base station may re-allocate the retransmission resource of the first UE based on the received measurement result. For example, when the retransmission resources of the first UE are insufficiently allocated (refer to FIG. 19), the number of retransmission resources of the first UE may be adjusted based on the measurement result. For example, when the retransmission resource of the first UE is insufficiently allocated, the base station may allocate the next retransmission resource of the first UE by N+2 times or N+3 times. For example, when the retransmission resources of the first UE are excessively allocated (refer to FIG. 18), the base station may adjust the number of retransmission resources of the first UE based on the measurement result. For example, when the retransmission resource of the first UE is excessively allocated, the base station may allocate the next retransmission resource of the first UE by N−2 times or N−3 times.

Figure 21:
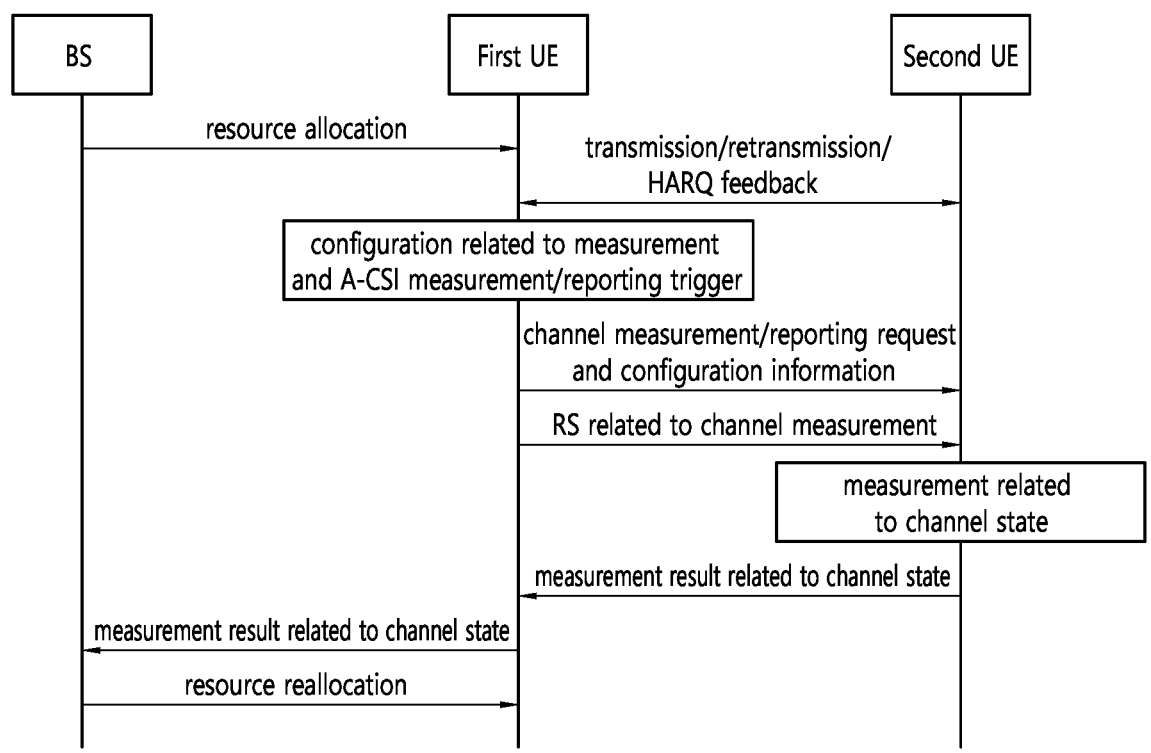
FIG. 21 shows an A-CSI measurement/reporting triggering procedure of a first UE performing mode 1 communication in accordance with an embodiment of the present disclosure.

Meanwhile, according to an embodiment of the present disclosure, a first UE may be the subject of A-CSI measurement/reporting triggering between UEs. FIG. 21 shows an A-CSI measurement/reporting triggering procedure of a first UE performing mode 1 communication in accordance with an embodiment of the present disclosure. The embodiment of FIG. 21 may be combined with various embodiments of the present disclosure.

2. A-CSI Measurement/Reporting Triggering Process of a First UE Performing Mode 1 Communication 1) For example, first, a base station may receive a SR and a BSR from a first UE. Based on this, the base station may transmit the resource grant to the first UE. The base station may allocate resources to the first UE through the resource grant. In this case, the base station may allocate the resource to the first UE in the configured grant method of NR. For example, the first UE may be allocated N times the retransmission resources among the general transmission resources from the base station.

2-1) For example, the first UE may retransmit by using all of the N-th retransmission resources allocated from the base station, and may receive a NACK for the N-th retransmission. For example, when the first UE retransmits using all of the N-th retransmission resources allocated from the base station, and the first UE receives a NACK for the N-th retransmission, it may be a case in which the base station allocates a small amount of retransmission resources, and an additional retransmission resource request may be required. For example, when the base station insufficiently allocates retransmission resources to the first UE, the A-CSI measurement/reporting triggering condition may be satisfied. For example, the case that the base station insufficiently allocates retransmission resources to the first UE may be a case that the first UE performs sidelink retransmission using the last retransmission resource among the retransmission resources, and receives NACK information from the second UE in response thereto 2-2) For example, the first UE may not use all of the resources for N retransmissions allocated from the base station, but may perform retransmission using fewer resources and receive an ACK for the last retransmission. For example, the first UE does not use all of the N retransmission resources allocated from the base station, the first UE retransmits using less resources, and when the first UE receives the ACK for the last retransmission, it may be a case that the base station over-allocates retransmission resources. For example, the retransmission may have been performed N−1 times or N−2 times. For example, when retransmission is performed N−1 times or N−2 times, the condition of A-CSI measurement/reporting triggering may be satisfied. For example, when the first UE performs sidelink retransmission using a retransmission resource prior to the last retransmission resource among the retransmission resources, and receives ACK information from the second UE in response thereto, a condition of A-CSI measurement/reporting triggering may be satisfied.

3) For example, the first UE may trigger the A-CSI measurement/reporting to the second UE. For example, the first UE may transmit an RS related to the measurement of the channel state to the second UE. For example, the first UE may perform configuration for A-CSI measurement/reporting. For example, the first UE may transmit configuration information related to the configuration to the second UE. For example, the configuration information may include a report type, an RS type, a resource used for reporting, and a report content.

4) For example, the second UE may perform measurement related to the channel state based on the received RS. The second UE may transmit the measurement result related to the channel state to the first UE.

5) For example, the first UE may transmit the received measurement result to the base station.

6) For example, the base station may re-allocate the retransmission resource of the first UE based on the received measurement result. For example, when the base station is allocated insufficient retransmission resources of the first UE (refer to FIG. 19), the number of retransmission resources of the first UE may be adjusted based on the measurement result. For example, when a small amount of the retransmission resource of the first UE is allocated, the base station may allocate the next retransmission resource of the first UE by N+2 times or N+3 times. For example, when the retransmission resources of the first UE are excessively allocated (refer to FIG. 18), the base station may adjust the number of retransmission resources of the first UE based on the measurement result. For example, when the retransmission resource of the first UE is excessively allocated, the base station may allocate the next retransmission resource of the first UE by N−2 times or N−3 times.

Meanwhile, the triggering condition may also be applied to a UE performing mode 2 communication, in which the UE performs resource scheduling by itself without being allocated a resource from the base station. For example, the UE may be a UE performing NR V2X mode 2 communication. For example, a UE performing mode 2 communication may select an initial transmission resource and a reserved transmission resource from a preconfigured resource pool. For example, the UE may select a resource to be used for sidelink communication through the selection process. For example, when the UE performs the resource selection for each PDU to be transmitted, if a reserved transmission resource is used for retransmission, when a specific condition is satisfied, the UE may trigger A-CSI measurement/reporting. That is, for example, it may be seen that the A-CSI measurement/reporting triggering condition is satisfied when the UE fails to transmit even though retransmission using all of the resources reserved for retransmission. For example, it may be considered that the A-CSI measurement/reporting triggering condition is satisfied when the ACK is received before all the reserved resources allocated by the UE are used.

Figure 22:
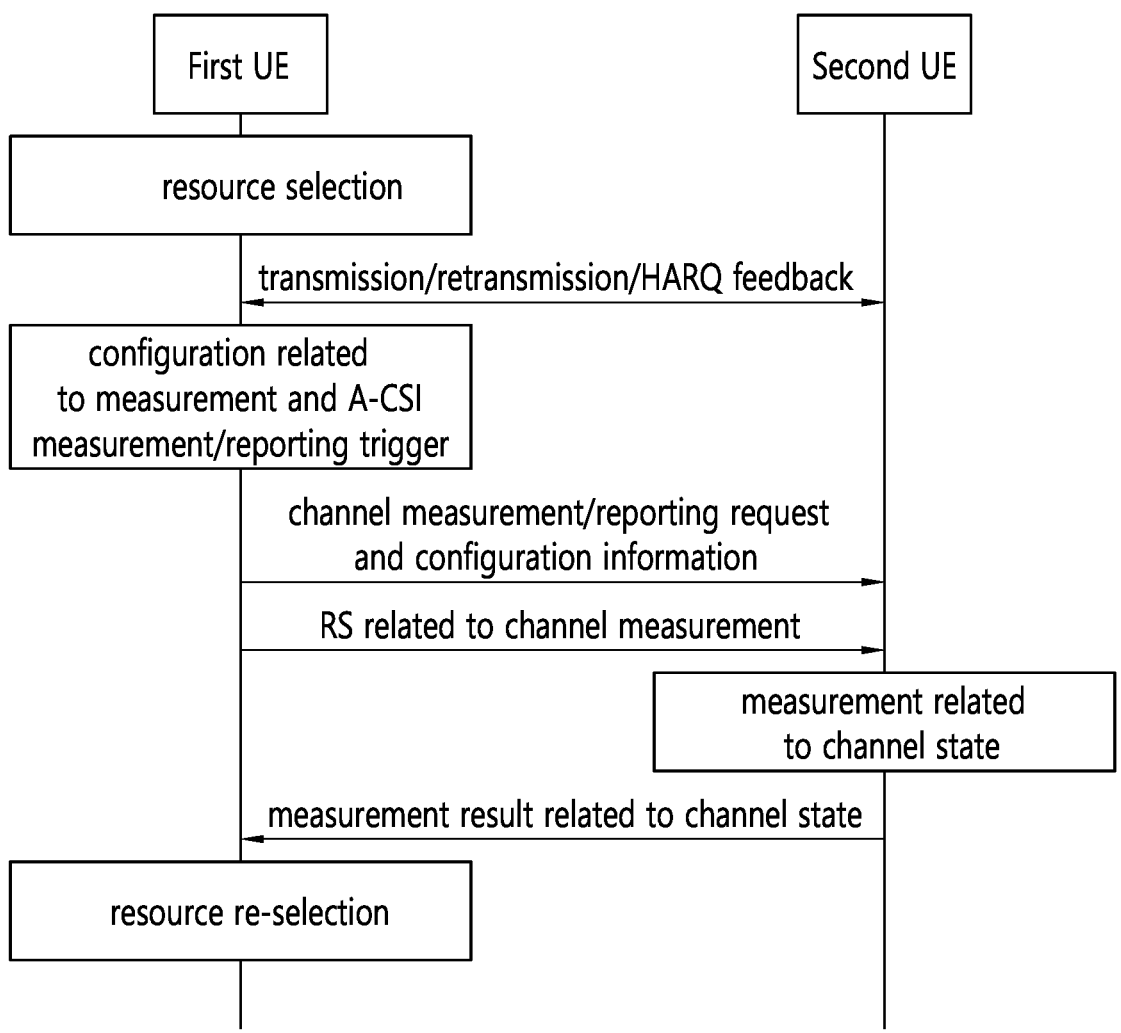
FIG. 22 shows an A-CSI measurement/reporting triggering procedure of a first UE performing mode 2 communication in accordance with an embodiment of the present disclosure.

FIG. 22 shows an A-CSI measurement/reporting triggering procedure of a first UE performing mode 2 communication in accordance with an embodiment of the present disclosure. The embodiment of FIG. 22 may be combined with various embodiments of the present disclosure.

3. A-CSI Measurement/reporting Triggering Process of a First UE Performing Mode 2 Communication 1) A first UE may perform resource selection from a predefined resource pool. For example, the resource selected at this time may include an initial transmission resource and a transmission resource reserved for retransmission. For example, the resource selection may be a mode 2 resource selection. For example, a transmission resource reserved for retransmission may have been selected N times. The first UE may communicate with the second UE using the initial transmission resource and the reserved transmission resource.

2-1) For example, the first UE may use the reserved transmission resource for retransmission. The first UE may retransmit using all of the N times of the reserved transmission resources, and may receive a NACK for the Nth retransmission. For example, when the first UE uses the reserved transmission resource for retransmission, the first UE performs retransmission using all of the N reserved transmission resources, and the first UE receives the NACK for the N-th retransmission, it may be a case that the first UE allocated a small amount of reserved transmission resources, and additional reserved transmission resource allocation may be required. For example, when the first UE allocates less reserved transmission resources for retransmission, the A-CSI measurement/reporting triggering condition may be satisfied. For example, when the first UE performs sidelink retransmission using the last retransmission resource among the retransmission resources, and the first UE receives NACK information from the second UE in response thereto, a condition of A-CSI measurement/reporting triggering may be satisfied.

2-2) For example, the first UE may use the reserved transmission resource for retransmission. The first UE does not use all of the N reserved transmission resources, and may retransmit using fewer resources and receive an ACK for the last retransmission. For example, when the first UE uses the reserved transmission resource for retransmission, and the first UE does not use all of the N reserved transmission resources, and retransmits using fewer resources than that, and the first UE receives the ACK for the last retransmission, it may be a case that the first UE overallocated the reserved transmission resource. For example, the retransmission may have been performed N−1 times or N−2 times. For example, when retransmission is performed N−1 times or N−2 times, the condition of A-CSI measurement/reporting triggering may be satisfied. For example, when the first UE performs sidelink retransmission using a retransmission resource prior to the last retransmission resource among the retransmission resources, and receives ACK information from the second UE in response thereto, a condition of A-CSI measurement/reporting triggering may be satisfied.

3) For example, the first UE may trigger the A-CSI measurement/reporting to the second UE. For example, the first UE may transmit the RS related to the measurement of the channel state to the second UE. For example, the first UE may perform configuration for A-CSI measurement/reporting. For example, the first UE may transmit configuration information related to the configuration to the second UE. The configuration information may include a report type, an RS type, a resource used for reporting, and a report content.

4) For example, the second UE may perform measurement related to the channel state based on the received RS. The second UE may transmit the measurement result related to the channel state to the first UE.

5) For example, the first UE may perform resource selection again based on the measurement result. For example, when the first UE selects insufficient transmission resources reserved for retransmission, the first UE may adjust the number of transmission resources reserved for retransmission based on the measurement result. For example, when a transmission resource reserved for retransmission is insufficiently selected, the first UE may select a transmission resource reserved for retransmission by N+2 times or N+3 times when re-selecting the resource. For example, when the reserved transmission resource is excessively allocated, the first UE may adjust the number of retransmissions based on the measurement result. For example, when the reserved transmission resource is excessively allocated, the first UE may select the reserved transmission resource for retransmission by N−2 times or N−3 times when selecting the resource again.

According to an embodiment of the present disclosure, the UE/base station may trigger A-CSI measurement/report, and perform resource allocation based on the measurement result related to the received channel state, thereby generating the effect of using resources more efficiently.

Figure 23:
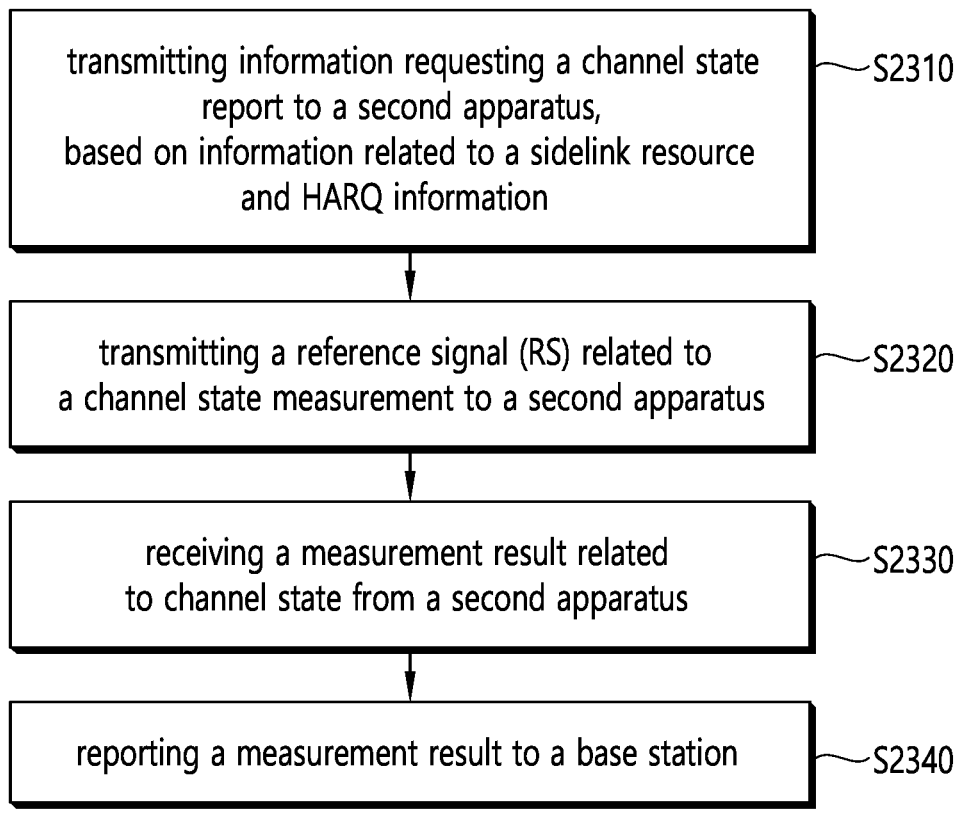
FIG. 23 shows a procedure in which a first apparatus triggers aperiodic channel state information (A-CSI) measurement/reporting, in accordance with an embodiment of the present disclosure.

FIG. 23 shows a procedure in which a first apparatus triggers aperiodic channel state information (A-CSI) measurement/reporting, in accordance with an embodiment of the present disclosure. The embodiment of FIG. 23 may be combined with various embodiments of the present disclosure.

In step S2310, a first apparatus may transmit information requesting a channel state report to a second apparatus, based on information related to a sidelink resource and HARQ information. In step S2320, the first apparatus may transmit a reference signal (RS) related to the channel state measurement to the second apparatus. In step S2330, the first apparatus may receive a measurement result related to the channel state from the second apparatus. In step S2340, the first apparatus may report the measurement result to a base station.

For example, the measurement result related to the channel state may include aperiodic channel state information (A-CSI).

Additionally, the first apparatus may perform sidelink retransmission using a last sidelink resource among the sidelink resources, and the first apparatus may receive negative acknowledgment (NACK) information from the second apparatus in response to the sidelink retransmission.

For example, the information requesting the channel state report is transmitted to the second apparatus based on the NACK information.

Additionally, the first apparatus may perform sidelink retransmission using a sidelink resource prior to a last sidelink resource among the sidelink resources, and the first apparatus may receive acknowledgment (ACK) information from the second apparatus in response to the sidelink retransmission, For example, the information requesting the channel state report is transmitted to the second apparatus based on the ACK information.

For example, the HARQ information may include ACK information or NACK information.

For example, the sidelink resource may be a sidelink resource allocated to the first apparatus by the base station.

For example, the sidelink resource may be a sidelink resource selected by the first apparatus for sidelink transmission.

Additionally, the first apparatus may determine whether to transmit the information requesting the channel state report to the second apparatus based on the information related to the sidelink resource and the HARQ information.

Additionally, the first apparatus may perform sidelink retransmission using a last sidelink resource among the sidelink resources, and the first apparatus may receive ACK information from the second apparatus in response to the sidelink retransmission.

For example, the first apparatus may determine not to transmit the information requesting the channel state report based on the ACK information.

For example, the sidelink resource may include a resource related to an initial transmission or a resource related to a retransmission.

Additionally, the first apparatus may report the information related to the channel state report to the base station based on the information related to the sidelink resource and HARQ information Additionally, the first apparatus may transmit configuration information related to the channel state measurement or configuration information related to the channel state report to the second apparatus.

Additionally, the first apparatus may select a sidelink resource again based on the measurement result.

According to an embodiment of the present disclosure, a first apparatus for reporting a channel state measurement may be proposed. For example, the first apparatus may comprise one or more memories storing instructions; one or more transceivers; and one or more processors connected to the one or more memories and the one or more transceivers. For example, the one or more processors may execute the instructions to: control the one or more transceivers to transmit information requesting a channel state report to a second apparatus, based on information related to a sidelink resource and HARQ information; control the one or more transceivers to transmit a reference signal (RS) related to the channel state measurement to the second apparatus; control the one or more transceivers to receive a measurement result related to the channel state from the second apparatus; and control the one or more transceivers to report the measurement result to a base station.

According to an embodiment of the present disclosure, an apparatus configured to control a first user equipment (UE) may be proposed. For example, the apparatus may comprise one or more processors; and one or more memories operably connected to the one or more processors and storing instructions. For example, the one or more processors may execute the instructions to: transmit information requesting a channel state report to a second UE, based on information related to a sidelink resource and HARQ information; transmit a reference signal (RS) related to a channel state measurement to the second UE; receive a measurement result related to the channel state from the second UE; and report the measurement result to a base station.

According to an embodiment of the present disclosure, a non-transitory computer-readable storage medium storing instructions may be proposed. For example, the instructions, when executed by one or more processors, mat cause the one or more processors to: transmit information requesting a channel state report to a second apparatus, based on information related to a sidelink resource and HARQ information; transmit a reference signal (RS) related to a channel state measurement to the second apparatus; receive a measurement result related to the channel state from the second apparatus; and report the measurement result to a base station.

Figure 24:
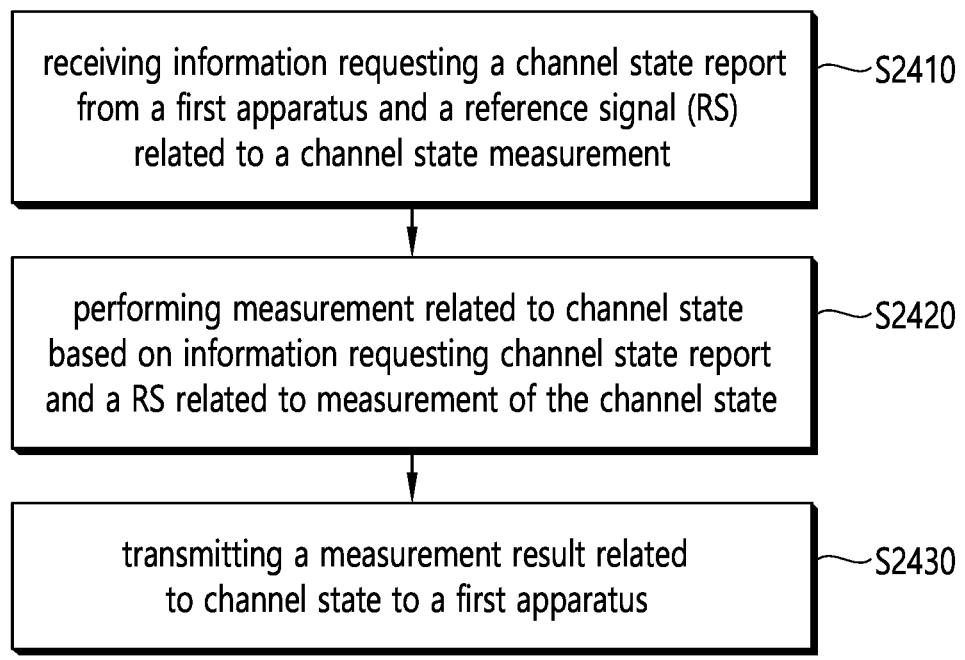
FIG. 24 shows a procedure in which a second apparatus performs aperiodic channel state information (A-CSI) measurement/reporting, in accordance with an embodiment of the present disclosure.

FIG. 24 shows a procedure in which a second apparatus performs aperiodic channel state information (A-CSI) measurement/reporting, in accordance with an embodiment of the present disclosure. The embodiment of FIG. 24 may be combined with various embodiments of the present disclosure.

In step S2410, the second apparatus may receive information requesting a channel state report from a first apparatus and a reference signal (RS) related to the channel state measurement. In step S2420, the second apparatus may perform measurement related to the channel state based on the information requesting the channel state report and the RS related to the measurement of the channel state. In step S2430, the second apparatus may transmit a measurement result related to the channel state to the first apparatus.

For example, the measurement result related to the channel state may include aperiodic channel state information (A-CSI). According to an embodiment of the present disclosure, a second apparatus for performing wireless communication be proposed. For example, the second apparatus may comprise one or more memories storing instructions; one or more transceivers; and one or more processors connected to the one or more memories and the one or more transceivers. For example, the one or more processors may execute the instructions to: control the one or more transceivers to receive information requesting a channel state report from a first apparatus and a reference signal (RS) related to the channel state measurement, control the one or more transceivers to perform measurement related to the channel state based on the information requesting the channel state report and the RS related to the measurement of the channel state, and control the one or more transceivers to transmit a measurement result related to the channel state to the first apparatus.

Additionally, for example, the measurement result related to the channel state may include aperiodic channel state information (A-CSI).

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
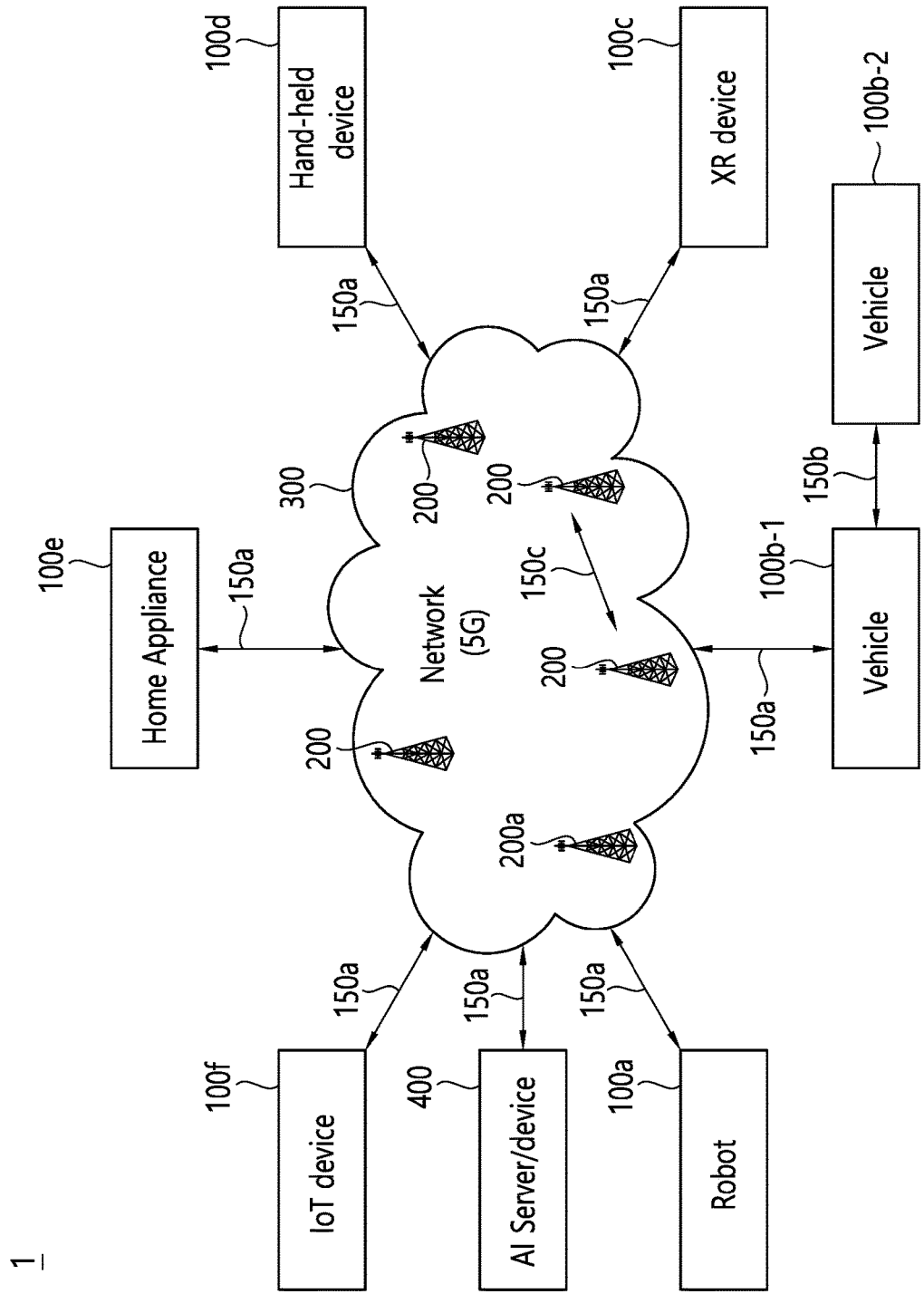
FIG. 25 shows a communication system 1, in accordance with an embodiment of the present disclosure.

FIG. 25 shows a communication system 1, in accordance with an embodiment of the present disclosure.

Referring to FIG. 25, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
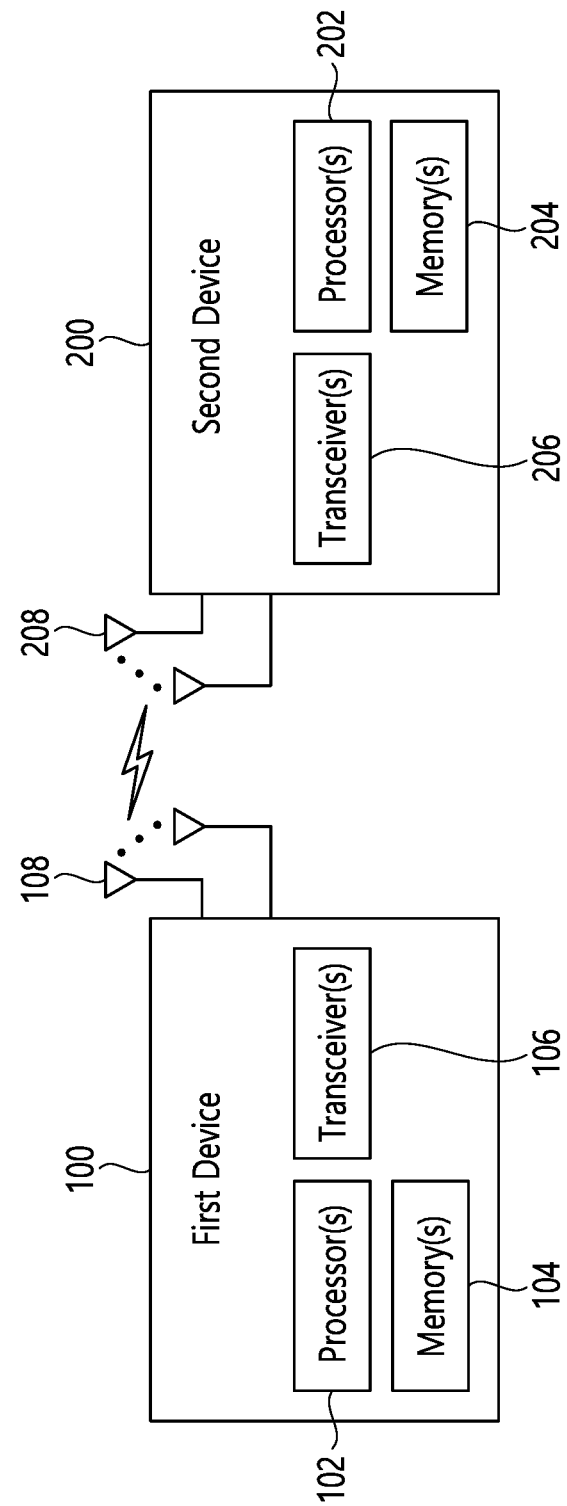
FIG. 26 shows wireless devices, in accordance with an embodiment of the present disclosure.

FIG. 26 shows wireless devices, in accordance with an embodiment of the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x } of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
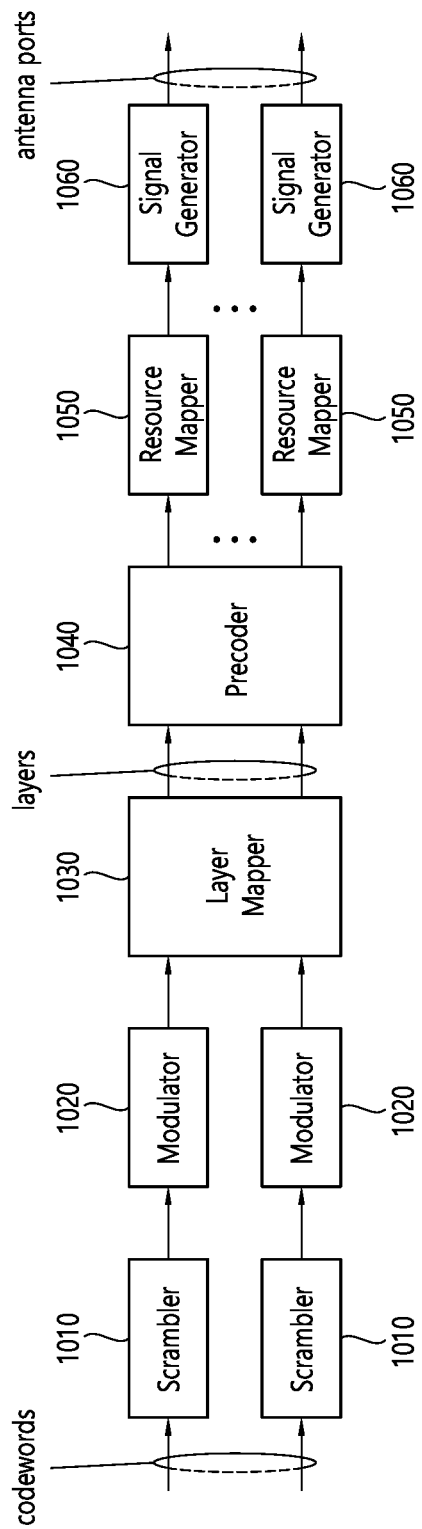
FIG. 27 shows a signal process circuit for a transmission signal, in accordance with an embodiment of the present disclosure.

FIG. 27 shows a signal process circuit for a transmission signal, in accordance with an embodiment of the present disclosure.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
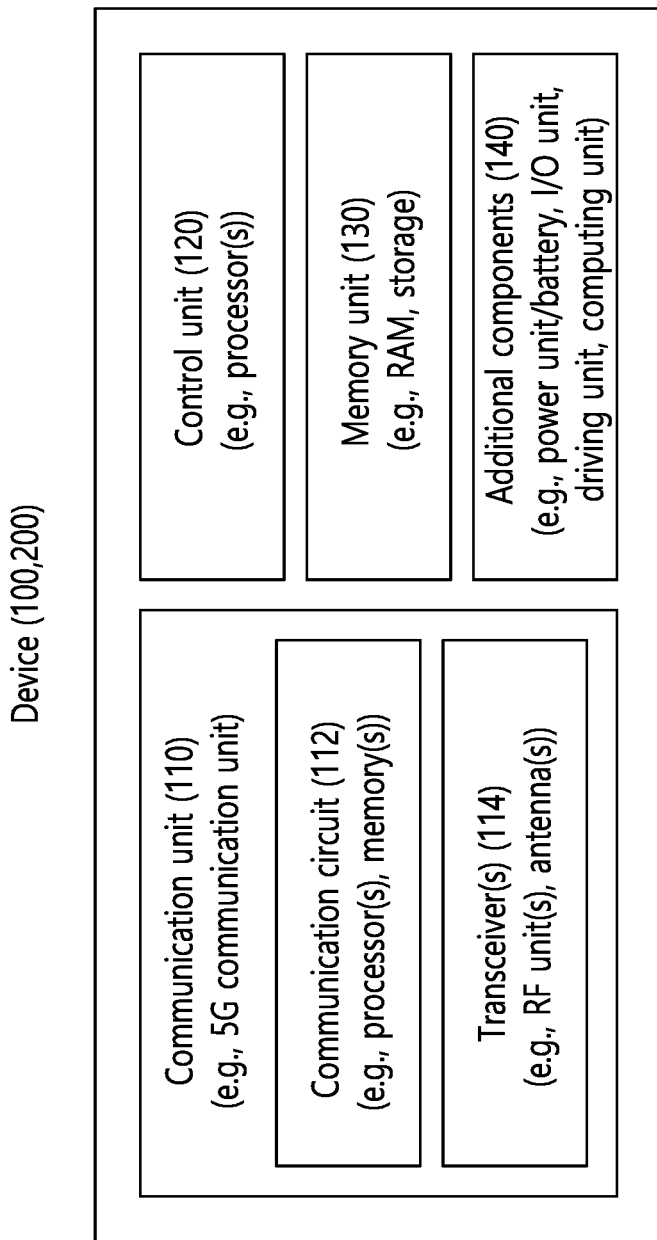
FIG. 28 shows another example of a wireless device, in accordance with an embodiment of the present disclosure.

FIG. 28 shows another example of a wireless device, in accordance with an embodiment of the present disclosure. The wireless device may be implemented in various forms according to a use-case/service (refer to FIG. 25).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wireles sly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
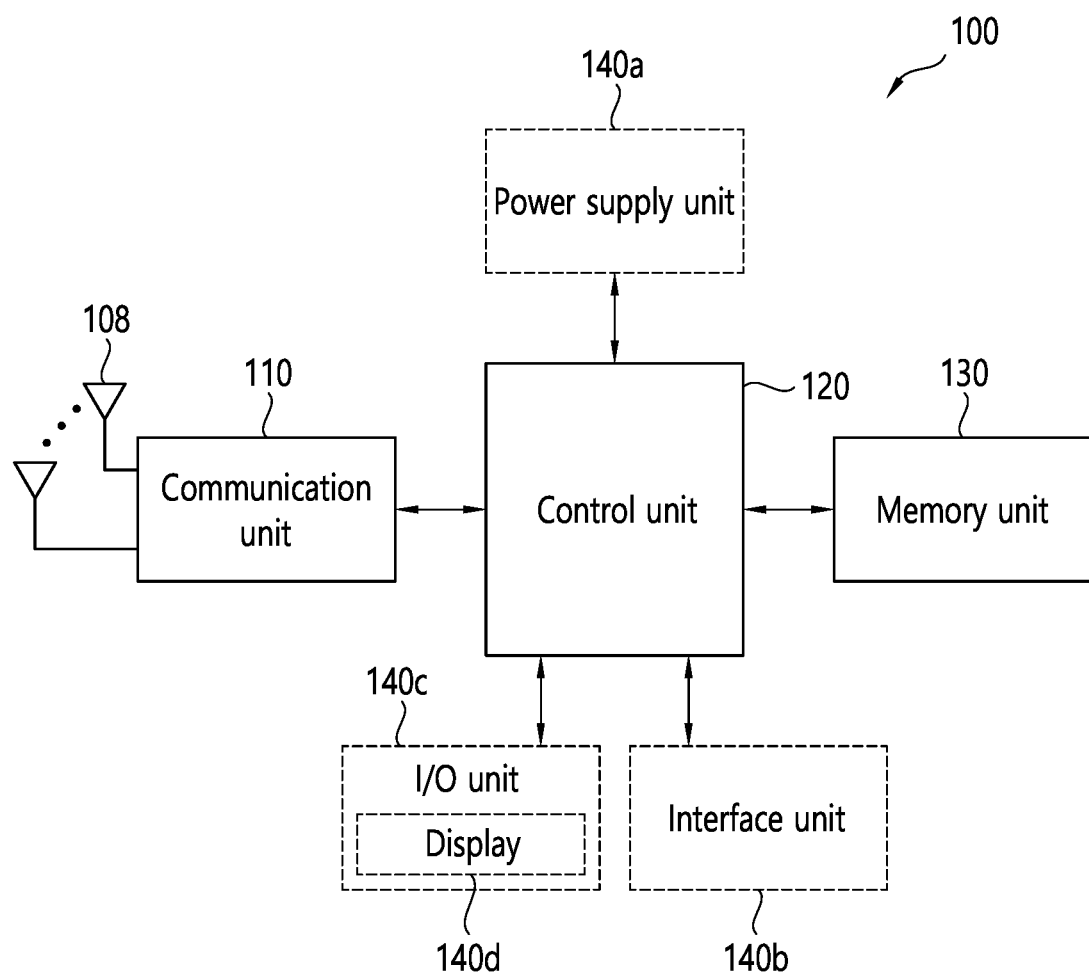
FIG. 29 shows a hand-held device, in accordance with an embodiment of the present disclosure.

FIG. 29 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to140c correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 30:
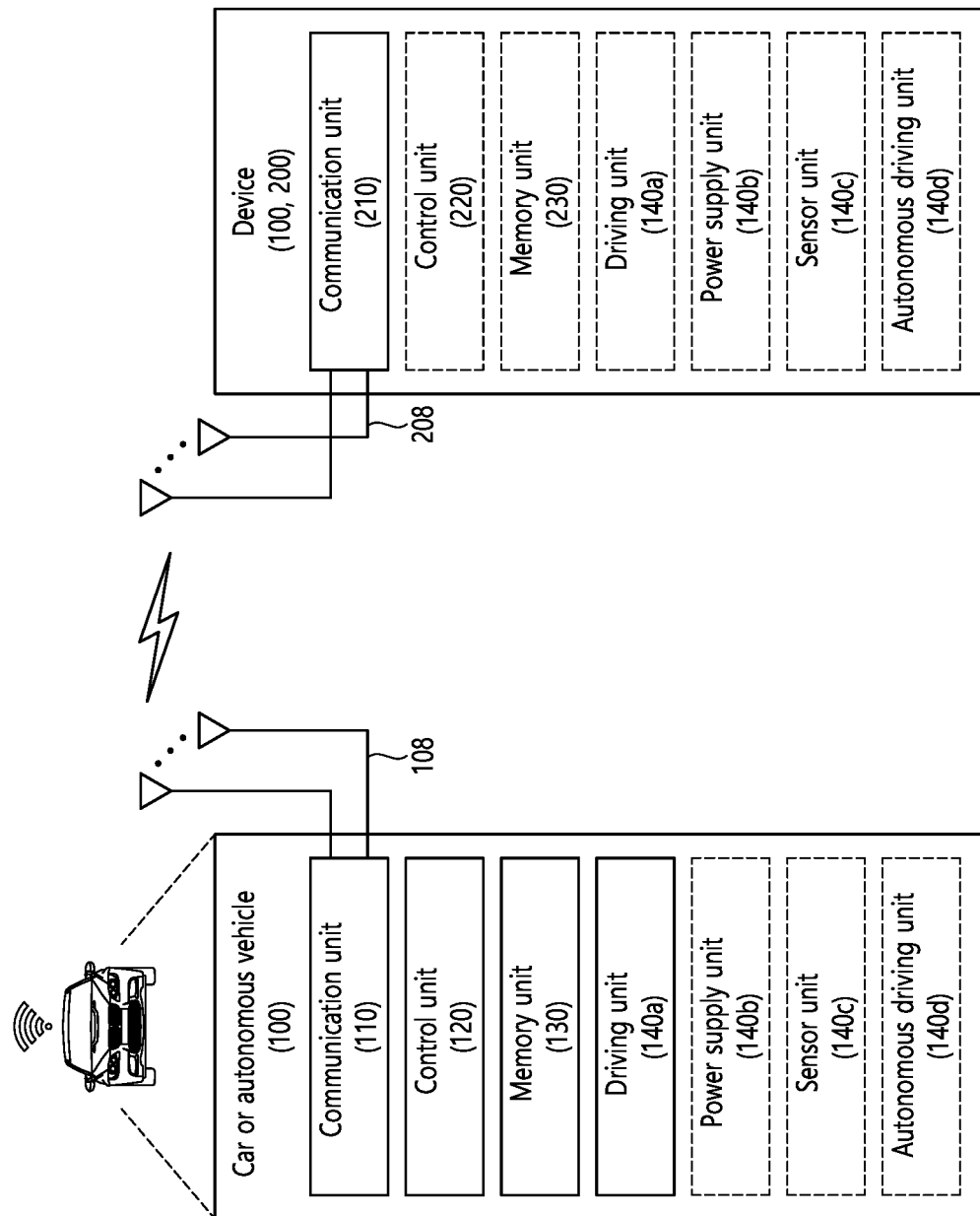
FIG. 30 shows a vehicle or an autonomous vehicle, in accordance with an embodiment of the present disclosure.

FIG. 30 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 30, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
    performing a retransmission, to a second device, based on a last resource among resources;
    receiving, from the second device, hybrid automatic repeat request (HARQ) information including negative acknowledgment (NACK) in response to the retransmission,
    transmitting, to the second device, information for requesting a channel state report, based on the NACK;
    transmitting, to the second device, a reference signal (RS) related to a channel state measurement;
    receiving, from the second device, a measurement result related to the channel state report and the channel state measurement; and
    reporting, to a base station, the measurement result.

2. The method of claim 1,
    wherein the resources are allocated to the first device by the base station.
3. The method of claim 1,
    wherein the resources are selected by the first device for communication.
4. The method of claim 1,
    wherein the resources include a resource related to an initial transmission or a resource related to a retransmission.
5. The method of claim 1, further comprising:
    transmitting, to the second device, configuration information related to the channel state measurement or configuration information related to the channel state report.
6. The method of claim 1,
    wherein the measurement result related to the channel state report and the channel state measurement includes aperiodic channel state information (A-CSI).
7. The method of claim 1,
    wherein the resources are sidelink resources.
8. The method of claim 7,
    wherein the sidelink resources are allocated to the first device by the base station.
9. The method of claim 7,
    wherein the sidelink resources are selected by the first device for sidelink communication.
10. The method of claim 7,
    wherein the sidelink resources include a resource related to an initial transmission or a resource related to a retransmission.
11. The method of claim 7, further comprising:
    reporting, to the base station, the information related to the channel state report based on the information related to the sidelink resources and the HARQ information.
12. The method of claim 7, further comprising:
    selecting sidelink resources again based on the measurement result.
13. The method of claim 1,
    wherein the resources are sidelink resources,
    wherein the retransmission is a sidelink retransmission, and
    wherein the last resource is a sidelink last resource.
14. A first device comprising:
    at least one transceiver;
    at least one processor; and
    at least one memory connected to the at least one processor and storing instructions that, based on being executed by the at least one processor, cause the first device to perform operations comprising:
    performing a retransmission, to a second device, based on a last resource among resources;
    receiving, from the second device, hybrid automatic repeat request (HARQ) information including negative acknowledgment (NACK) in response to the retransmission, transmitting, to the second device, information for requesting a channel state report, based on the NACK;
    transmitting, to the second device, a reference signal (RS) related to a channel state measurement;
    receiving, from the second device, a measurement result related to the channel state report and the channel state measurement; and
    reporting, to a base station, the measurement result.
15. A processing device adapted to control a first device, the processing device comprising:

at least one processor; and at least one memory connected to the at least one processor and storing instructions that, based on being executed by the at least one processor, cause the first device to perform operations comprising:

performing a retransmission, to a second device, based on a last resource among resources;

receiving, from the second device, hybrid automatic repeat request (HARQ) information including negative acknowledgment (NACK) in response to the retransmission, transmitting, to the second device, information for requesting a channel state report, based on the NACK;

transmitting, to the second device, a reference signal (RS) related to a channel state measurement;

receiving, from the second device, a measurement result related to the channel state report and the channel state measurement; and reporting, to a base station, the measurement result.

* * * * *